US008597103B2

(12) United States Patent
Bigelow, Jr. et al.

(10) Patent No.: US 8,597,103 B2

(45) **Date of Patent: *Dec. 3, 2013**

(54) GAMING SYSTEM HAVING MULTI-PLAYER WHEEL BONUS GAME AND CHARACTERISTIC SELECTION

(75) Inventors: Robert F. Bigelow, Jr., Reno, NV (US); Christiaan R. Champagne, Reno, NV (US); Dwayne A. Davis, Reno, NV (US); Damien C. Ennis, Reno, NV (US); Michael P. Khamis, Reno, NV (US); Marcos Mello, Reno, NV (US); David N. Myers, Reno, NV (US); Michael M. Oberberger, Reno, NV (US); David M. Palmer, Reno, NV (US)

(73) Assignee: IGT, Las Vegas, NV (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/335,105

(22) Filed: Dec. 22, 2011

(65) Prior Publication Data

US 2012/0094741 A1 Apr. 19, 2012

Related U.S. Application Data

(63) Continuation of application No. 11/936,494, filed on Nov. 7, 2007, now Pat. No. 8,100,754.

(51) Int. Cl.
*A63F 13/00* (2006.01)

(52) U.S. Cl.
USPC .................... 463/20; 463/19; 463/21; 463/22

(58) Field of Classification Search
USPC ......................................... 463/19, 20, 21, 22
See application file for complete search history.

(56) References Cited

U.S. PATENT DOCUMENTS

| | | | |
|---|---|---|---|
| 5,788,573 | A | 8/1998 | Baerlocher et al. |
| 5,823,874 | A | 10/1998 | Adams |

(Continued)

FOREIGN PATENT DOCUMENTS

| | | |
|---|---|---|
| WO | WO 2004/054670 | 7/2004 |
| WO | WO 2008/070055 | 6/2008 |

OTHER PUBLICATIONS

Third Party Submission in Published Application Under 37 C.F.R. § 1.99 filed for U.S. Appl. No. 13/335,105, dated Jun. 18, 2012 (2 pages).

(Continued)

*Primary Examiner* — Paul A D'Agostino
*Assistant Examiner* — Brandon Gray
(74) *Attorney, Agent, or Firm* — Neal, Gerber & Eisenberg LLP

(57) ABSTRACT

In an embodiment, a gaming system includes a multi-player wheel game. The game includes a wheel having a plurality of sections. Each of the sections is associated with an award symbol. Each of the sections is also associated with a characteristic independent of the award symbol, such as a color. The gaming system enables each of a plurality of active players to select at least one of the characteristics associated with the wheel. The gaming system activates the wheel and indicates at least one section of the wheel. The gaming system and at the gaming devices associated with the gaming system provide an award associated with the award symbol of the indicated section. For each active player that selected the characteristic associated with the indicated section, the gaming system and the gaming devices associated with the gaming system provide a modified award.

30 Claims, 19 Drawing Sheets

(56) References Cited

U.S. PATENT DOCUMENTS

| | | | |
|---|---|---|---|
| 5,848,932 | A | 12/1998 | Adams |
| 5,851,148 | A | 12/1998 | Brune et al. |
| 5,911,418 | A | 6/1999 | Adams |
| 5,947,820 | A | 9/1999 | Morro et al. |
| 6,102,798 | A | 8/2000 | Bennett |
| 6,123,333 | A | 9/2000 | McGinnis, Sr. et al. |
| 6,162,121 | A | 12/2000 | Morro et al. |
| 6,168,520 | B1 | 1/2001 | Baerlocher et al. |
| 6,217,022 | B1 | 4/2001 | Astaneha |
| 6,224,483 | B1 | 5/2001 | Mayeroff |
| 6,334,814 | B1 | 1/2002 | Adams |
| 6,336,863 | B1 | 1/2002 | Baerlocher et al. |
| 6,605,000 | B2 | 8/2003 | Adams |
| 6,663,448 | B1 | 12/2003 | Davies et al. |
| 6,663,489 | B2 | 12/2003 | Baerlocher |
| 6,749,502 | B2 | 6/2004 | Baerlocher |
| 6,793,577 | B1 | 9/2004 | Wilkins et al. |
| 6,827,646 | B2 | 12/2004 | Adams |
| D503,951 | S | 4/2005 | Karstens |
| 6,890,255 | B2 | 5/2005 | Jarvis et al. |
| D512,464 | S | 12/2005 | Karstens |
| D512,465 | S | 12/2005 | Karstens |
| 7,004,835 | B2 | 2/2006 | Baerlocher |
| 7,040,983 | B2 | 5/2006 | Dolloff et al. |
| 7,056,192 | B2 | 6/2006 | Venigalla et al. |
| 7,056,209 | B2 | 6/2006 | Baerlocher et al. |
| 7,059,967 | B2 | 6/2006 | Baerlocher |
| 7,066,814 | B2 | 6/2006 | Glavich et al. |
| 7,128,646 | B2 | 10/2006 | Baerlocher et al. |
| 7,144,321 | B2 | 12/2006 | Mayeroff |
| 7,179,169 | B2 | 2/2007 | Beaulieu et al. |
| 7,198,570 | B2 | 4/2007 | Rodgers et al. |
| 7,204,488 | B2 | 4/2007 | Ilievski |
| 7,210,997 | B2 | 5/2007 | Hughs-Bair et al. |
| 7,226,358 | B2 | 6/2007 | Miller et al. |
| 7,294,055 | B2 | 11/2007 | Baerlocher et al. |
| 7,306,520 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,326,109 | B2 | 2/2008 | Baerlocher |
| 7,354,342 | B2 | 4/2008 | Paulsen et al. |
| 7,399,226 | B2 | 7/2008 | Mishra |
| 2003/0064773 | A1 | 4/2003 | Baerlocher et al. |
| 2003/0078093 | A1 | 4/2003 | Simms et al. |
| 2004/0048645 | A1 | 3/2004 | Webb et al. |
| 2004/0053660 | A1 | 3/2004 | Webb et al. |
| 2004/0053665 | A1 | 3/2004 | Baerlocher |
| 2004/0248640 | A1 | 12/2004 | Kaminkow et al. |
| 2005/0026671 | A1 | 2/2005 | Baerlocher |
| 2005/0026673 | A1 | 2/2005 | Paulsen et al. |
| 2005/0054415 | A1 | 3/2005 | Kaminkow et al. |
| 2005/0054421 | A1 | 3/2005 | Hughs-Baird et al. |
| 2005/0059486 | A1 | 3/2005 | Kaminkow |
| 2005/0075159 | A1 | 4/2005 | Kaminkow et al. |
| 2005/0215307 | A1 | 9/2005 | Jarvis et al. |
| 2006/0025195 | A1 | 2/2006 | Pennington et al. |
| 2006/0040721 | A1 * | 2/2006 | Cuddy et al. .................... 463/16 |
| 2006/0046821 | A1 | 3/2006 | Kaminkow et al. |
| 2006/0046822 | A1 | 3/2006 | Kaminkow et al. |
| 2006/0046823 | A1 | 3/2006 | Kaminkow et al. |
| 2006/0063584 | A1 | 3/2006 | Cregan |
| 2006/0068875 | A1 | 3/2006 | Cregan et al. |
| 2006/0073872 | A1 | 4/2006 | B-Jensen et al. |
| 2006/0073873 | A1 | 4/2006 | Rodgers et al. |
| 2006/0135241 | A1 * | 6/2006 | Wolf et al. ...................... 463/16 |
| 2006/0170155 | A1 | 8/2006 | Silverman |
| 2006/0189364 | A1 | 8/2006 | Baerlcoher |
| 2006/0205465 | A1 | 9/2006 | Dollof et al. |
| 2006/0237905 | A1 | 10/2006 | Nicely et al. |
| 2006/0246989 | A1 | 11/2006 | Glavich et al. |
| 2006/0252485 | A1 | 11/2006 | Baerlocher et al. |
| 2007/0087811 | A1 | 4/2007 | Mayeroff |
| 2007/0120320 | A1 | 5/2007 | Miltenberger et al. |
| 2007/0135203 | A1 | 6/2007 | Nicely |
| 2007/0135204 | A1 | 6/2007 | Nicely |
| 2007/0149292 | A1 | 6/2007 | Kaminkow et al. |
| 2007/0167211 | A1 | 7/2007 | Rodgers et al. |
| 2007/0218982 | A1 | 9/2007 | Baerlocher |
| 2007/0225060 | A1 | 9/2007 | Yoshimura |
| 2008/0020817 | A1 | 1/2008 | Kaminkow |
| 2008/0020842 | A1 | 1/2008 | Kaminkow |
| 2008/0051168 | A1 | 2/2008 | Kaminkow |
| 2008/0070702 | A1 | 3/2008 | Kaminkow |
| 2008/0090643 | A1 | 4/2008 | Kaminkow |
| 2008/0090647 | A1 | 4/2008 | Kaminkow |
| 2008/0102927 | A1 | 5/2008 | Mayeroff |
| 2008/0113760 | A1 | 5/2008 | Baerlocher |
| 2008/0148542 | A1 | 6/2008 | Mayeroff |

OTHER PUBLICATIONS

Partial U.S. Patent Application Publication No. 2007/0225060 submitted with Third Party Submission in Published Application Under 37 C.F.R. § 1.99 for U.S. Appl. No. 13/335,105 (4 pages).

* cited by examiner

A MULTI-PLAYER WHEEL SPIN BONUS GAME HAS BEEN ACTIVATED! YOU WILL BE ASSIGNED TO ONE OF THE STATIONARY INDICATORS ON THE WHEEL, THE WHEEL WILL SPIN AND WHEN IT STOPS, YOU WILL WIN AN AWARD EQUAL TO THE VALUE OF THE SECTION INDICATED BY YOUR ASSIGNED INDICATOR.

GAMING SYSTEM HAVING MULTI-PLAYER WHEEL BONUS GAME AND CHARACTERISTIC SELECTION

PRIORITY CLAIM

This application is a continuation of, claims the benefit of and priority to U.S. patent application Ser. No. 11/936,494, filed on Nov. 7, 2007, which issued as U.S. Pat. No. 8,100,754 on Jan. 24, 2012, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain proposed multiple player gaming systems include a single display which displays a single award for multiple players. Players of such gaming systems generally have little or no way of differentiating themselves from other players of the gaming devices. It is therefore desirable to provide new gaming systems and methods for operating gaming systems with features that enable players to distinguish themselves from other players.

Gaming devices that increase the opportunities to obtain awards and increase the size of the awards are also desirable. Players are attracted to games that provide several larger awards and the opportunity to obtain a large award. Therefore, to increase player enjoyment and excitement, it is desirable to provide new games for gaming devices and methods for operating gaming devices.

SUMMARY

The present disclosure provides gaming systems and methods for operating gaming systems which include a plurality of gaming devices and a controller configured to operate with each of the gaming devices to enable a plurality of players to play a game. In one embodiment, the game includes a symbol display device, illustrated as wheel, having a plurality of sections. Each section of the wheel is associated with at least one award symbol. Each section of the wheel is also associated with at least one characteristic, independent of the award symbol. In one embodiment, each award symbol is associated with a value and each characteristic is associated with at least one modifier. In another embodiment, each award symbol is associated with a multiplier instead of a value. The gaming system controller and gaming devices are configured to enable each of a plurality of active players to select at least one of the characteristics associated with the wheel, and to activate the wheel to indicate at least one of the sections. In one embodiment, the controller and the gaming devices provide an award associated with the value of the award symbol of the at least one indicated section and a modified award associated with at least one of the characteristics. In another embodiment, the controller and the gaming devices provide an award equal to a player's wager amount multiplied by the multiplier associated with the award symbol of the indicated section, and a modified award associated with at least one of the characteristics.

In an embodiment, the game is a bonus game, the plurality of characteristics are colors, and the plurality of modifiers are multipliers. Upon the occurrence of a suitable triggering event, the gaming system controller activates the bonus game for each of a plurality of active players of the gaming devices and enables each of the players to select one of the colors associated with the sections of the wheel. The gaming system controller and gaming devices activate the wheel to indicate a section of the wheel. For each player that selected the color associated with the indicated section, the controller and gaming devices provide a modified award based on the value of the award symbol multiplied by the multiplier associated with the color of the indicated section. For each of the plurality of players that did not select the color associated with the indicated section, the controller and the gaming devices provide an award associated with the value of the award symbol of the indicated section.

In another embodiment, the game is a bonus game, the plurality of characteristics are colors, and the plurality of modifiers are multipliers. Upon the occurrence of a suitable triggering event, the gaming system controller activates the bonus game for each of a plurality of active players of the gaming devices, and operates with the gaming devices to assign each of the plurality of the players to one of a plurality of stationary indicators and enable each of the players to select one of the colors associated with the sections of the wheel. The controller and gaming devices activate the wheel and, for each player that selected the color associated with the player's indicated section, provide a modified award based on the value of the award symbol multiplied by the multiplier associated with the color of the player's indicated section. For each of the players assigned to an indicator that does not indicate their selection, the controller and gaming devices provide an award associated with the value of award symbol of the section indicated by the player's assigned indicator.

In an additional embodiment, the game is a bonus game, the plurality of characteristics are colors, and the plurality of modifiers are multipliers. In this embodiment, the gaming system controller enables each of a plurality of active players of the gaming devices to accumulate points or tokens during game play. Upon the occurrence of a suitable triggering event, the gaming system controller activates the bonus game and for each token accumulated, enables each of the plurality of players to select one of the sections of the wheel and one of the colors associated with the sections of the wheel. The gaming system is configured to indicate a player's selection of a section by, for example, illuminating the section or placing one of the tokens onto the section. In this embodiment, the controller does not initially cause the display of the colors associated with each of the sections of the wheel. Instead, the controller is configured to cause the display of the colors for each of the sections of the wheel after each of the players selects at least one section of the wheel and after the wheel is activated. Thus, in this embodiment, the controller is configured to activate the wheel, indicate a section of the wheel, and then after the activation and indication, display at least one color in association with each of the sections of the wheel. After the displaying of at least one color in association with each of the sections of the wheel, the controller and gaming devices provide, for each of the players that selected the indicated section and the characteristic displayed in association with the indicated section, a modified award based on the value of the award symbol of the indicated section multiplied by the multiplier associated with the color displayed in association with the indicated section. For each of the players that selected the indicated section and did not select the characteristic displayed in association with the indicated section, the controller and the gaming devices provide an award associated with the value of the award symbol of the indicated section.

It is therefore an advantage of the present disclosure to provide a bonus game that enables multiple players to share a similar experience.

Another advantage of the present disclosure is to provide a multi-player game with an element of competition.

Another advantage of the present disclosure is to provide a multi-player wheel game that uses color selection as a multiplying factor.

Additional features and advantages are described herein, and will be apparent from, the following Detailed Description and the figures.

DETAILED DESCRIPTION

The present disclosure may be implemented in various configurations for gaming machines, gaming devices or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
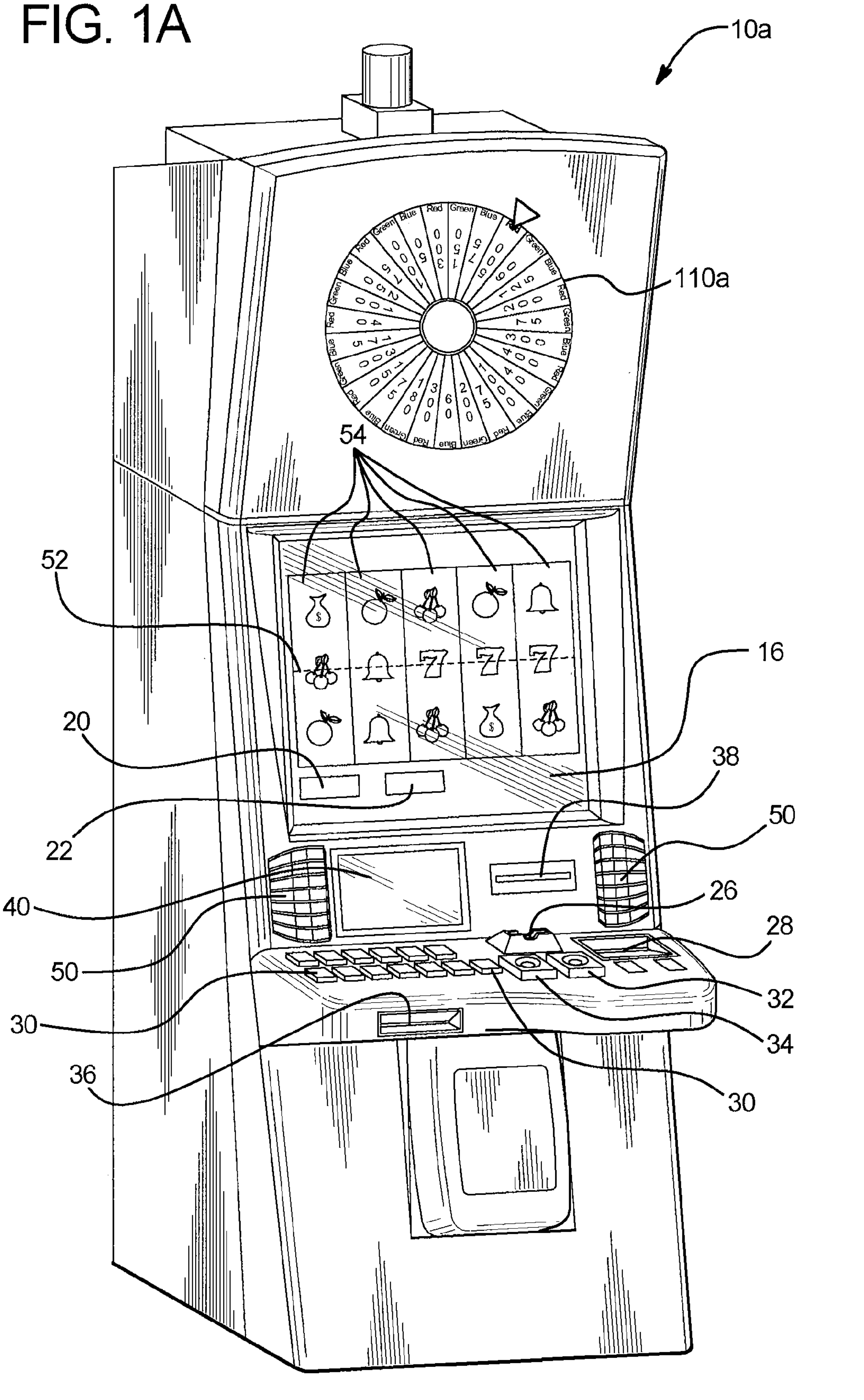
FIG. 1A is a front-side perspective view of one embodiment of the gaming device disclosed herein.
Figure 1B:
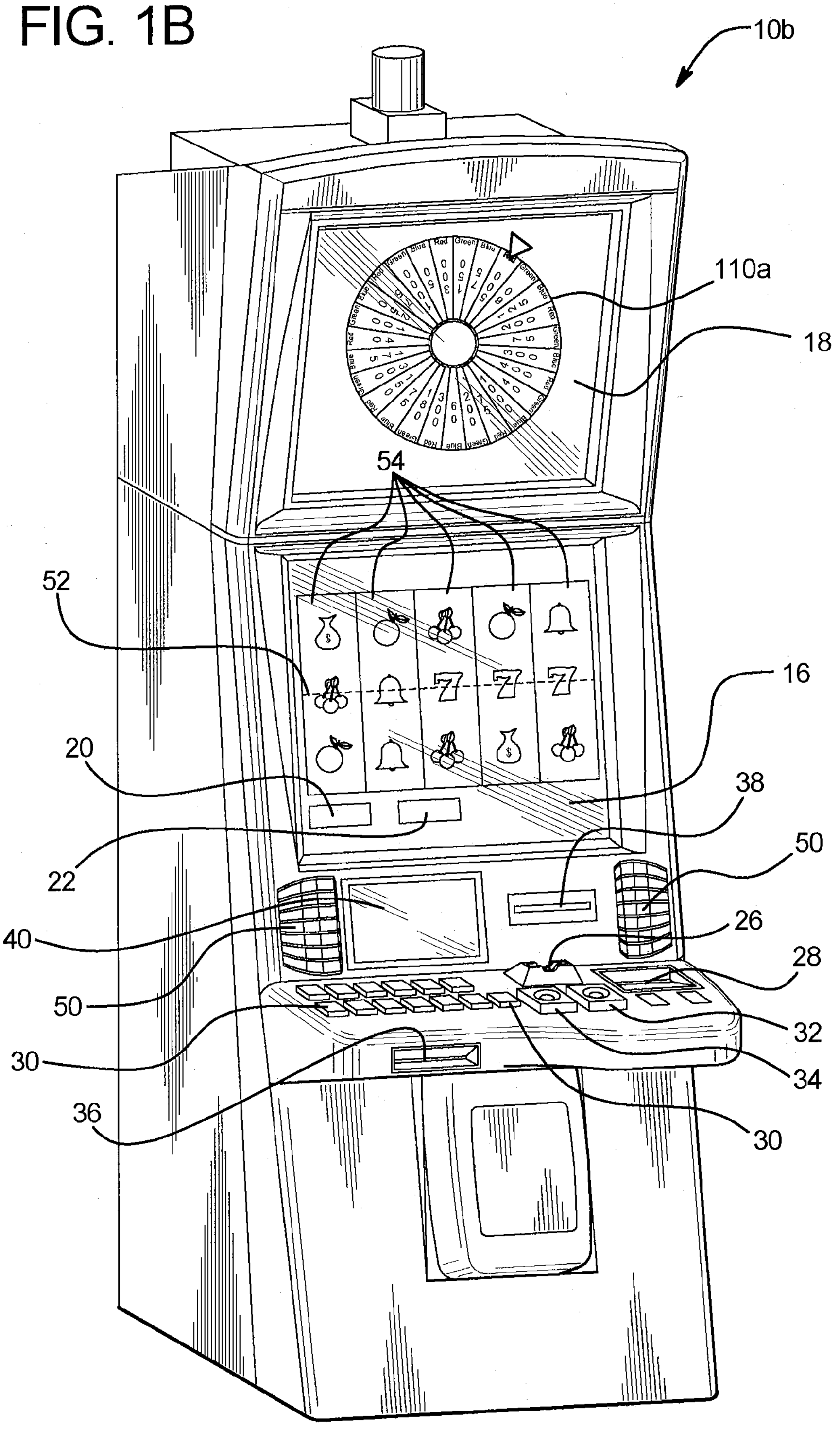
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
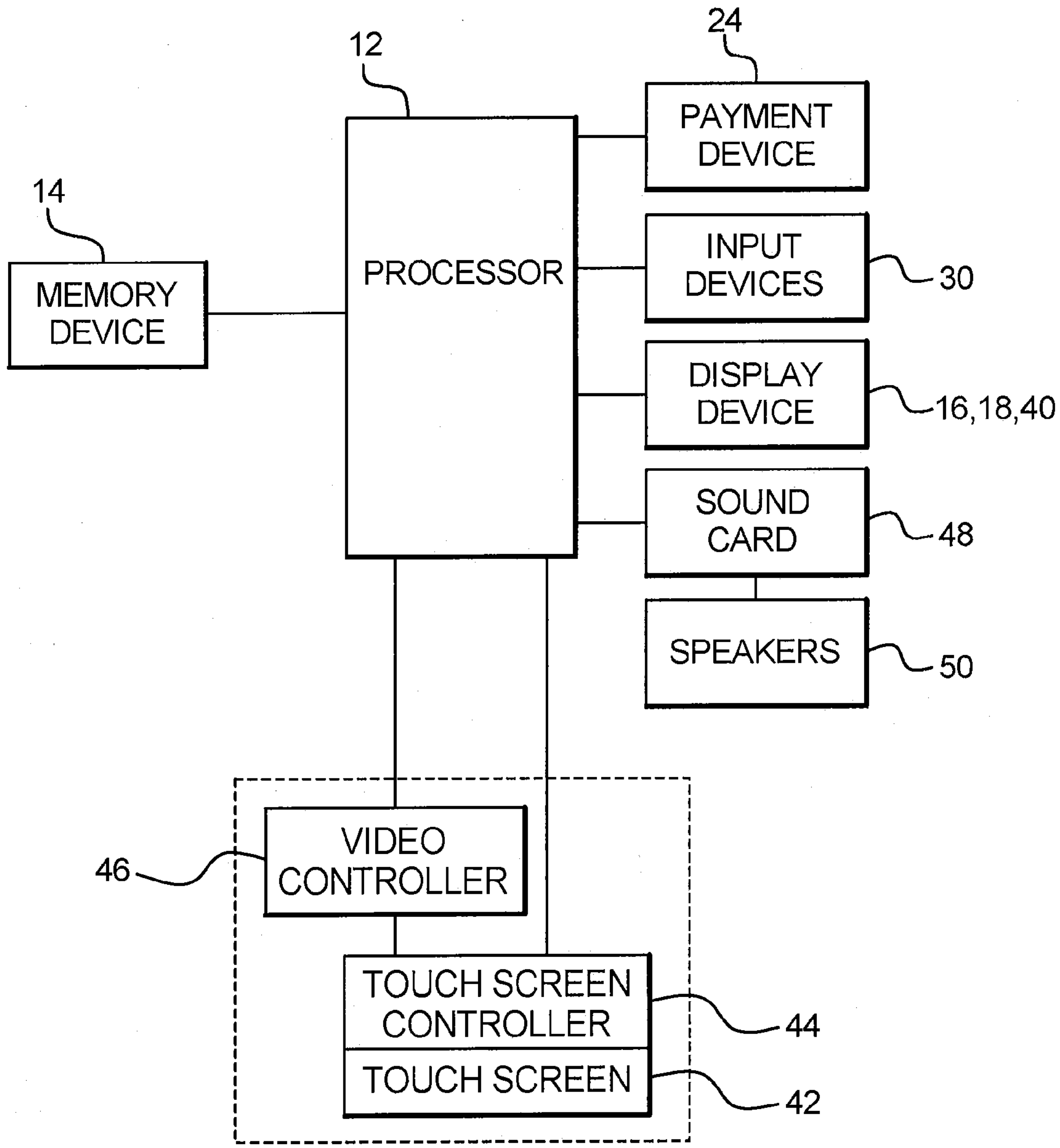
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game and an upper display which includes an electromechanical wheel 110. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. In the embodiment illustrated embodiment, the upper display device displays a wheel 110. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
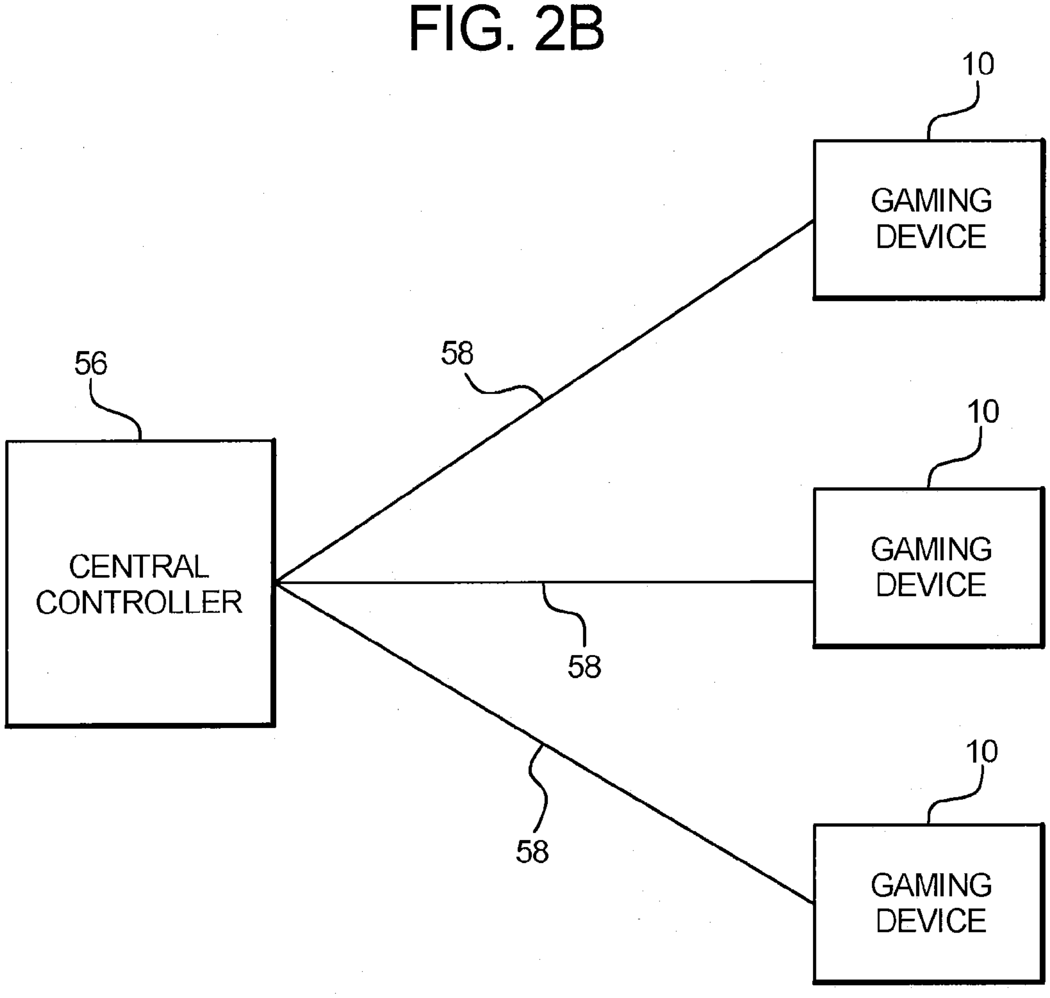
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Gaming System and Multi-Player Wheel Bonus Game

Figure 3:
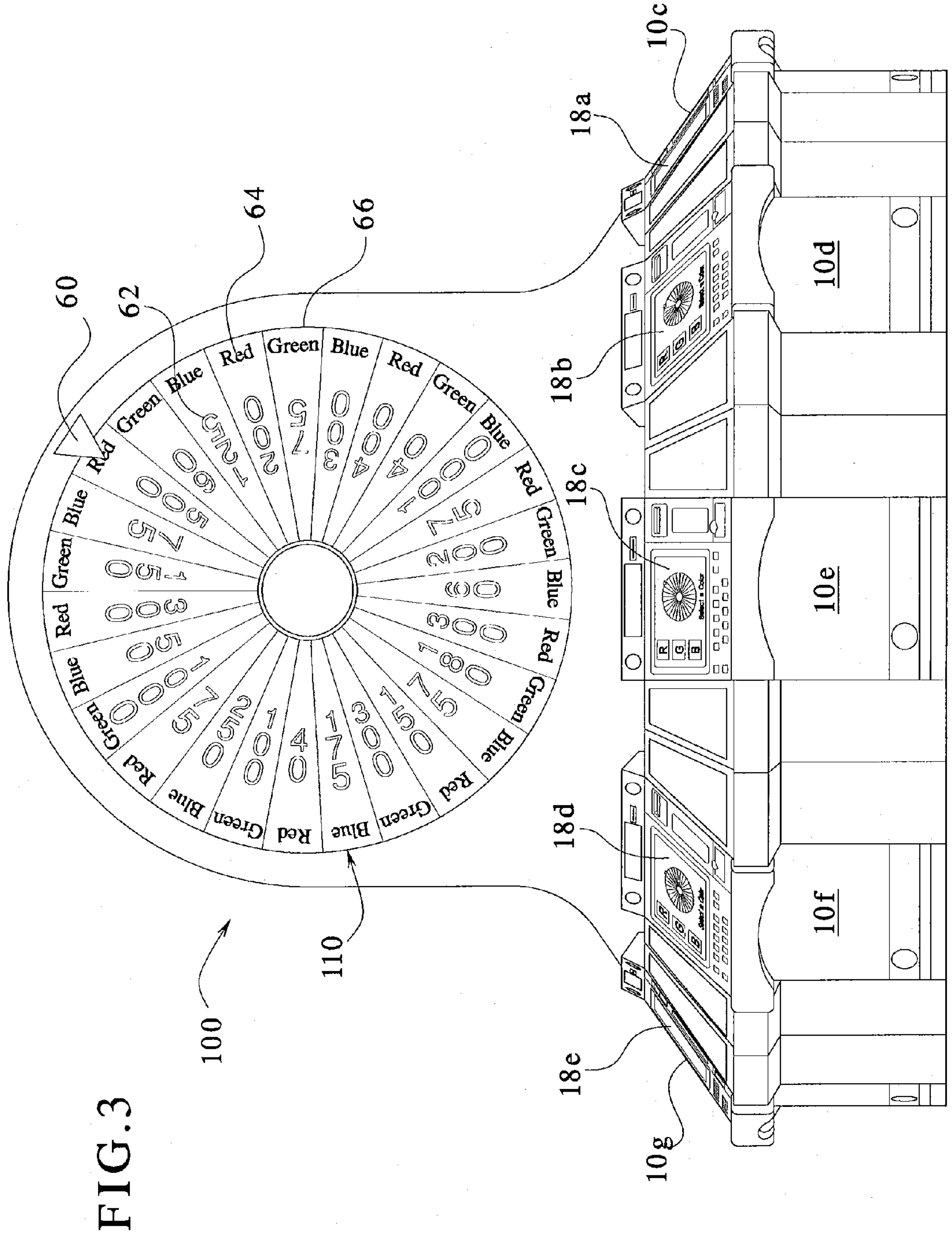
FIG. 3 is a front elevational view of one embodiment of a gaming system including a vertically oriented shared display having a wheel and a plurality of associated gaming devices.

Referring now to FIG. 3, one embodiment of a gaming system 100 including a multi-player wheel bonus game is illustrated. The gaming system 100 includes a vertically oriented shared symbol display illustrated as a wheel 110, indicator 60, and associated gaming devices 10*c* through 10*g*. It should be appreciated that the symbol display illustrated in each of the embodiments described herein can be any suitable symbol generating mechanism which is configured to display a plurality of suitable images, symbols or indicia. It should also be appreciated that the gaming system 100 can include any suitable alternative gaming devices, such as gaming devices 10*a* and 10*b* illustrated in FIG. 1A and FIG. 1B respectively. Gaming devices 10*c* through 10*g* of gaming system 100 include electronic video display devices 18*a* through 18*e* respectively. In the illustrated embodiment, display devices 18*a* through 18*e* each display the message, "SELECT A COLOR", and selection "R" corresponding to the color Red, selection "G" corresponding to the color Green, and selection "B" corresponding to the color Blue, which are all related to the operation of the multi-player bonus game, described in more detail below. In the illustrated embodiment, the wheel 110 is an electromechanical display with spatially fixed sections 66. Each of the sections 66 is associated with at least one characteristic, illustrated as a color 64. Each of the sections 66 is also associated with at least one award symbol 62, illustrated as values. In an alternative embodiment, the wheel 110 is displayed on a large electronic display, such as a video monitor.

In the illustrated embodiment, gaming system 100 orients gaming devices 10*c* through 10*g* such that players playing those gaming machines can view the activation of the wheel 110 and the awards associated with the bonus game during a play of the bonus game. Vertically oriented wheel 110 is advantageous in one respect because each player can easily see the entire wheel. However, it should be appreciated that in alternative embodiments any other suitable orientation of a wheel can be used, such as a horizontally oriented display. It should also be appreciated that in alternative embodiments, the gaming system which includes a multi-player wheel bonus game may not include a wheel. Instead, the gaming system controller could be configured to display the wheel only on each of the associated gaming devices.

FIGS. 4A, 4B, 4C, 4D, FIGS. 5A, 5B, 5C, 5D, 5E, and FIGS. 6A, 6B, 6D, and 6E, which are described in detail below, illustrate various embodiments of the multi-player bonus game displayed on display device 18*e* of gaming machine 10*g* of gaming system 100. However, it should be appreciated that the gaming system controller is configured to display the same embodiments on each of the display devices associated with gaming system 100.

In one embodiment, each gaming machine of each of the illustrated embodiments has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria). In one such embodiment, based on the gaming machine's state as well as one or more wager pools associated with the gaming machine, the central controller determines whether the triggering event occurs in association with that player. In one such embodiment, the player who consistently places a higher wager is more likely to cause a triggering event to occur than a player who consistently places a minimum wager.

Referring now generally to FIGS. 4A, 4B, 4C, and 4D, one embodiment of a gaming system including the multi-player wheel bonus game is illustrated. In this embodiment, the display device 18*e* includes player status indicator 68 to indicate the player's relationship relative to other players of the bonus game and wheel 110*a* in electronic video format. The wheel 110*a* includes a plurality of sections 66, such as sections 66*a*, 66*b*, and 66*c*, and indicator 60 adapted to indicate or point to one of the sections of the wheel. Each of the sections is associated with an award symbol 62. Each of the sections is also associated with a characteristic 64 independent of the award symbol, such as a color or any other suitable characteristic, such as people, places, or things. Each award symbol is associated with an award, such as a value. Each color is associated with a modifier, such as a multiplier. For example, section 66*a* is associated with a value 75 and a color green, section 66*b* is associated with a value 200 and a color red, and section 66*c* is associated with a value 125 and a color blue. In this embodiment, the color green is associated with a multiplier of 2×, the color red is associated with a multiplier of 5×, and the color blue is associated with a multiplier of 10×.

Table 1 illustrates the colors and values associated with the illustrated sections 66*a*, 66*b*, and 66*c* of the wheel 110*a*. Table 2 illustrates the multipliers associated with each of the illustrated characteristics of the wheel 110*a*, which are shown as colors.

TABLE 1

Example of Colors and Values Associated with the Sections of the Wheel

| Section | Color | Value |
|---|---|---|
| 66a | Green | 75 |
| 66b | Red | 200 |
| 66c | Blue | 125 |

TABLE 2

Example of Multipliers Associated with Each Color

| Color | Multiplier |
|---|---|
| Green | 2x |
| Red | 5x |
| Blue | 10x |

It should be appreciated that any suitable color and value can be associated with each of the sections of the wheel. In one embodiment, each of the colors associated with each of the sections of the wheel are different. In another embodiment, a plurality of the colors are different. In one embodiment, each of the values associated with each of the sections of the wheel are different. In another embodiment, a plurality of the values associated with each of the sections are different. In one embodiment, each of the multipliers associated with each of the colors are different. In another embodiment, a plurality of the multipliers are different. In another embodiment, each of the multipliers are the same. In one embodiment, the multipliers are selected from a pool of modifiers or a range of modifiers. In other embodiments, the multipliers are predetermined, randomly determined, determined based on the player's wager in the primary game, determined from the occurrence of one or more symbols or symbol combinations in the primary game, or determined based on any other suitable method. It should be appreciated that Table 1, Table 2 and the above description of alternative embodiments for colors, values, and multipliers applies to each of the embodiments described herein.

Figure 4A:
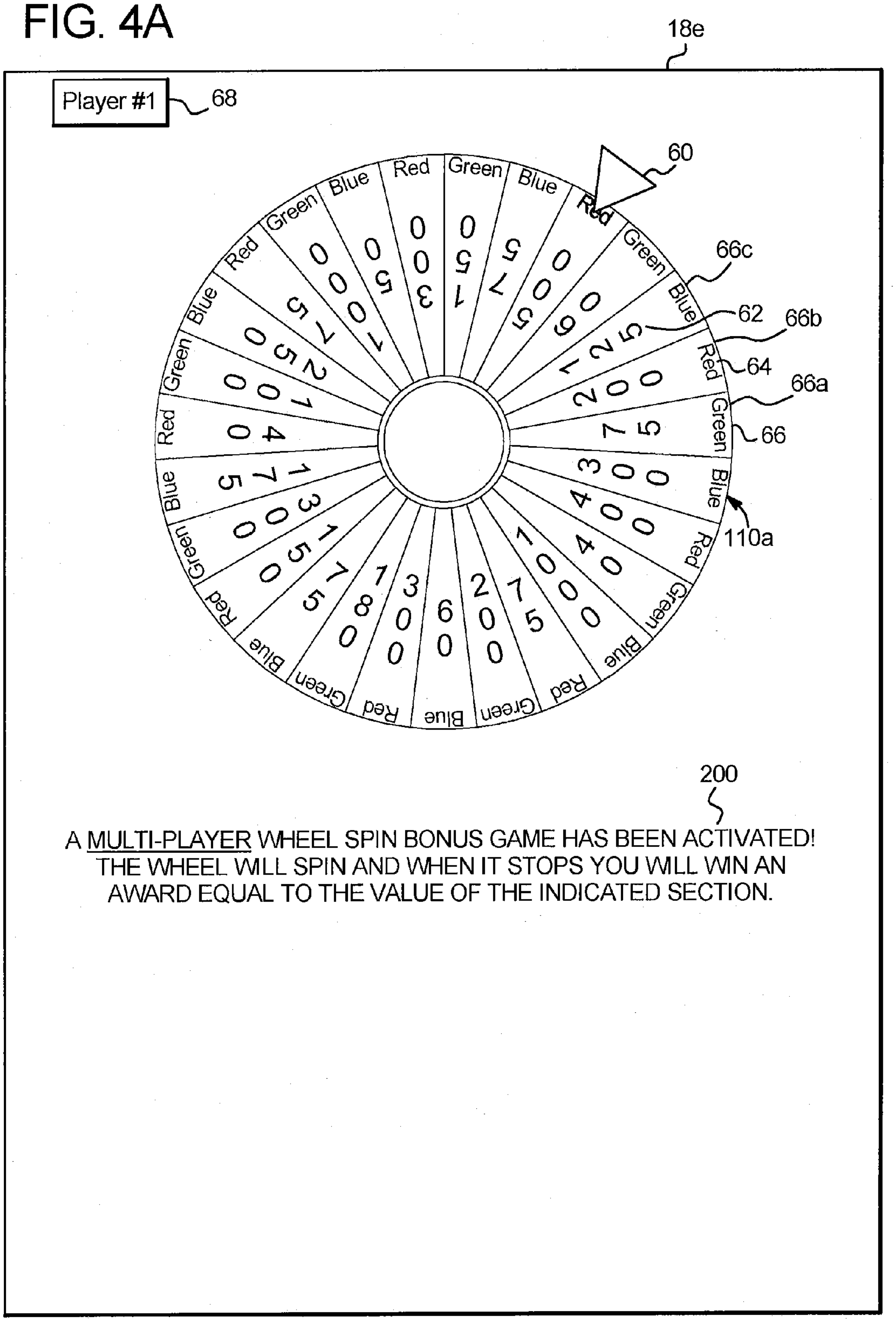
FIGS. 4A, 4B, 4C, and 4D are front elevational views of one embodiment of the present disclosure illustrating a multi-player wheel bonus game which enables each of the players to select a color associated with the wheel, provides an award for the indicated section, and provides a modified award associated with the selected color.

In one embodiment, upon the occurrence of a suitable triggering event, the gaming system activates the multi-player wheel bonus game and enables each active player of the plurality of individual gaming devices to play the bonus game. As seen in FIG. 4A, after the suitable triggering event occurs, the gaming system generates message 200 on display device 18*e* that reads, "A MULTI-PLAYER WHEEL BONUS GAME HAS BEEN ACTIVATED! THE WHEEL WILL SPIN AND WHEN IT STOPS YOU WILL WIN AN AWARD EQUAL TO THE VALUE OF THE INDICATED SECTION."

Figure 4B:
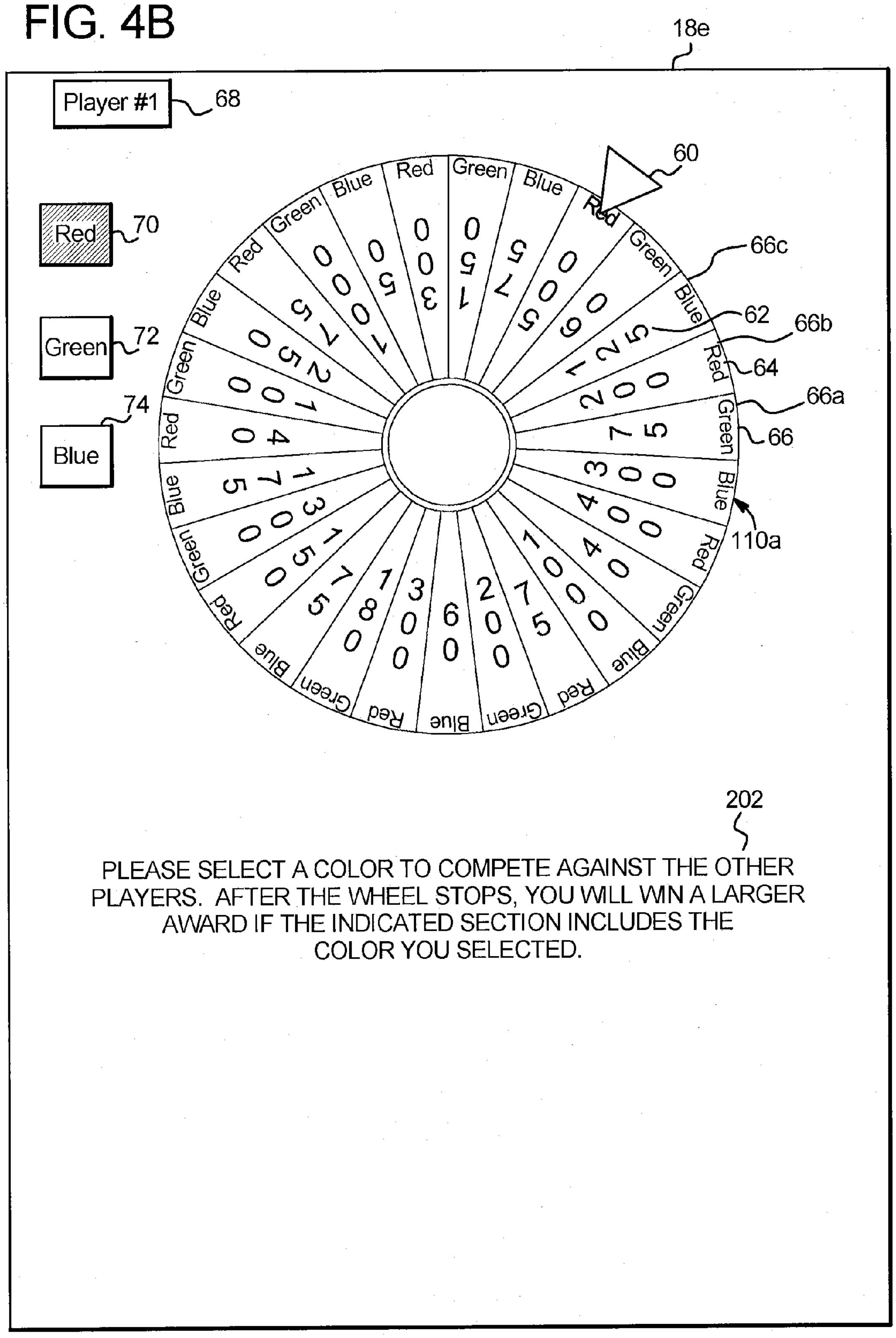

As seen in FIG. 4B, after the message 200 is generated, the gaming system prompts the player of gaming machine 10*g* to select a color by generating message 202 on display device 18*e* that reads, "PLEASE SELECT A COLOR TO COMPETE AGAINST THE OTHER PLAYERS. AFTER THE WHEEL STOPS, YOU WILL WIN A LARGER AWARD IF THE INDICATED SECTION OF THE WHEEL INCLUDES THE COLOR YOU SELECTED." As shown in FIG. 4B, the gaming system controller is configured to cause the display device 18*e* to display selections 70, 72, and 74. Each of the selections 70, 72, and 74 is associated with one of the characteristics of the wheel. For example, as illustrated in FIG. 4B, selection 70 is associated with the color red of the wheel, selection 72 is associated with the color green of the wheel, and selection 74 is associated with the color blue of the wheel. In this embodiment, the player selects the selection 70 associated with the color red, as indicated by selection 70 being highlighted or illuminated.

Figure 4C:
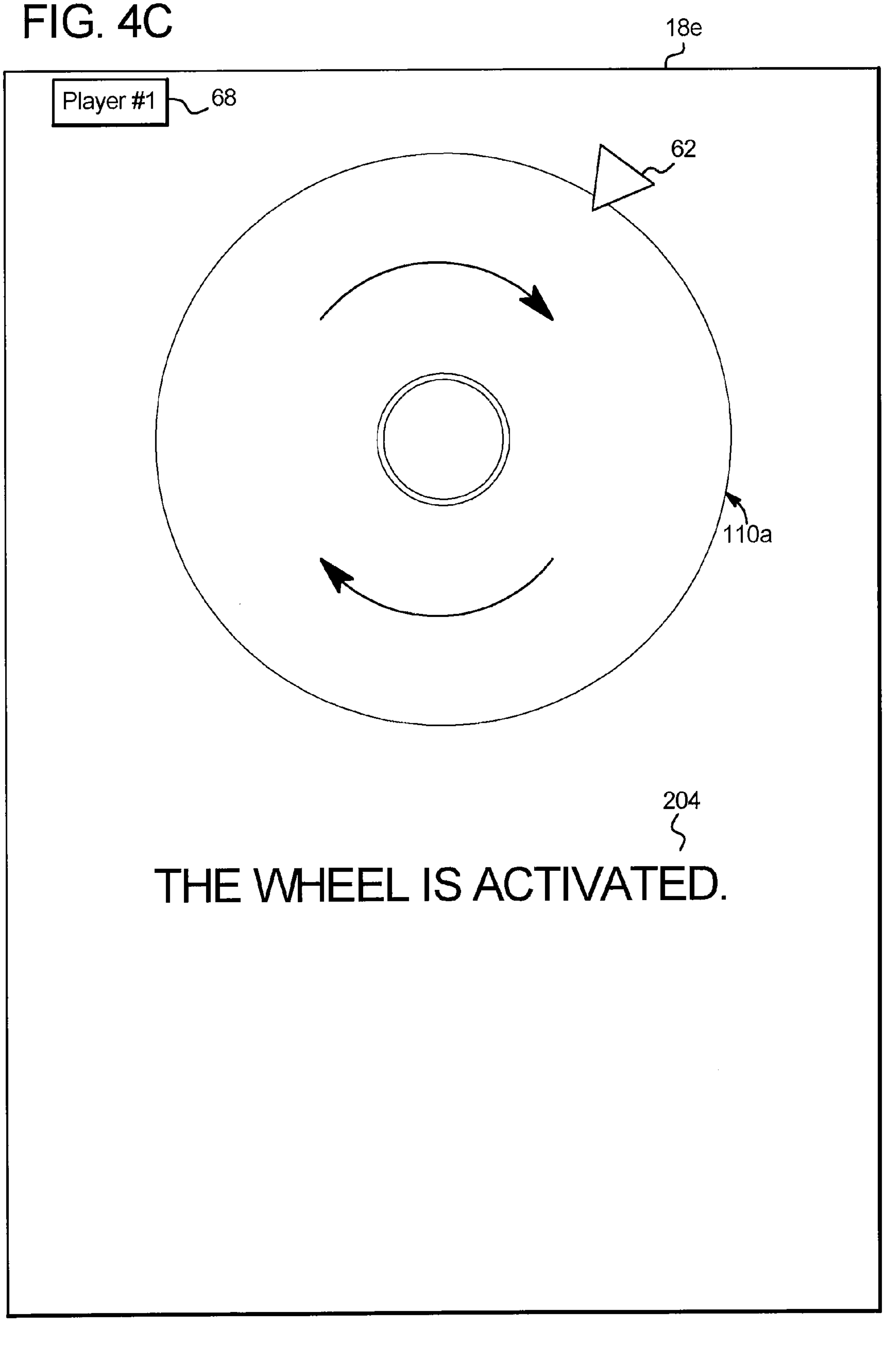
Figure 4D:
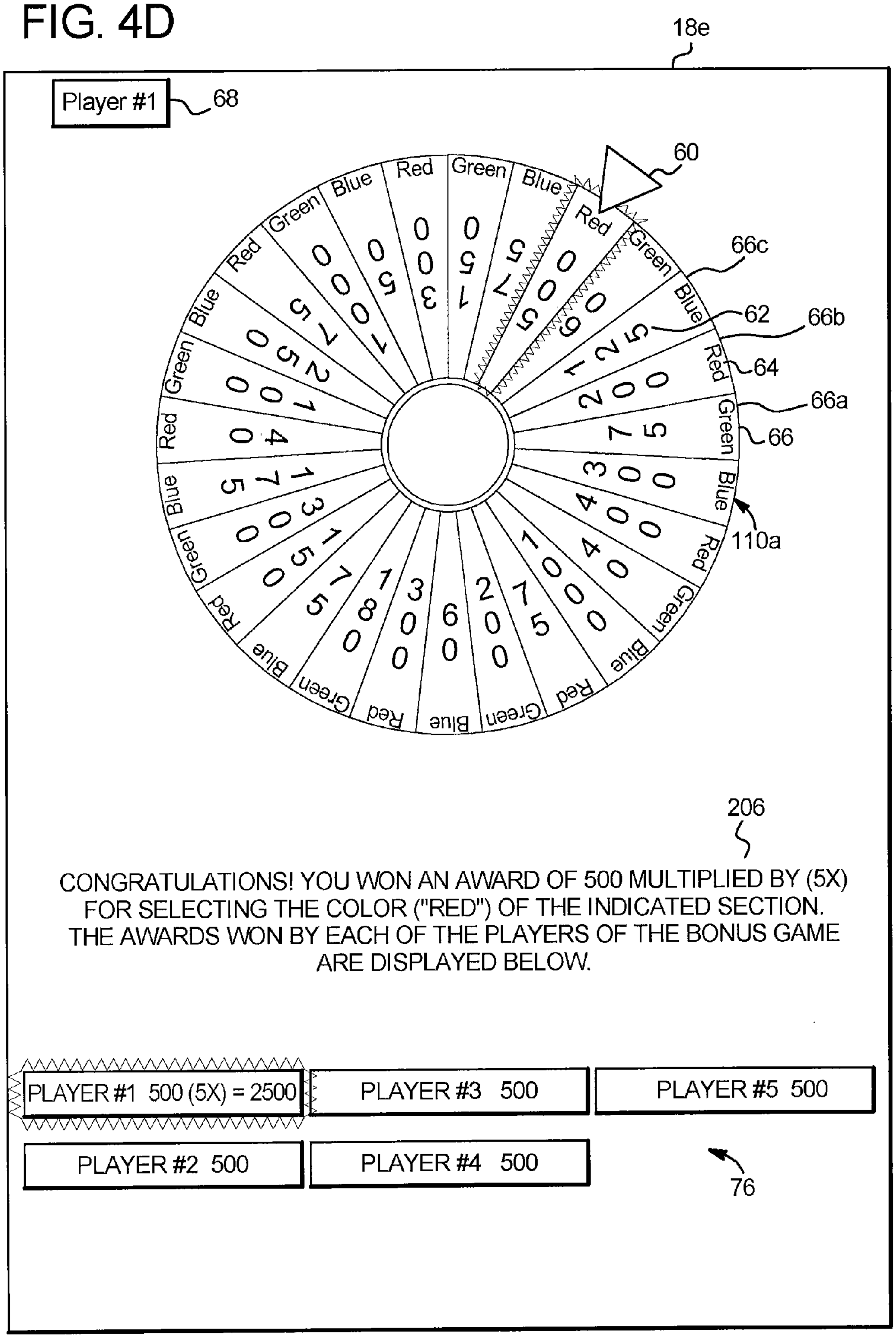

As shown in FIG. 4C, after the player selects a color, the gaming system activates or spins the wheel and generates message 204 on display device 18*e* that reads, "THE WHEEL IS ACTIVATED." As seen in FIG. 4D, after the gaming system stops the wheel, the gaming system causes the display 18*e* to highlight or illuminate the section of the wheel that indicator 60 points to or indicates. The indicated section is associated with an award value of 500 and the color red. In the illustrated embodiment, the gaming device controller causes the display 18*e* to illuminate or highlight the indicated section of the wheel. The gaming system and gaming device provide the player with an award of 500 for the value associated with the indicated section multiplied by (5×) for selecting the color red associated with the indicated section, for a total award of 2500. Player award display 76 displays the awards won by each of the active players of the multi-player bonus game. The gaming system generates message 206 on display device 18*e* that reads, "CONGRATULATIONS! YOU WON AN AWARD OF 500 MULTIPLIED BY (5×) FOR SELECTING THE COLOR ("RED") OF THE INDICATED SECTION. THE AWARDS WON BY EACH OF THE PLAYERS OF THE BONUS GAME ARE DISPLAYED BELOW."

Referring now generally to FIGS. 5A through 5E, another embodiment of a gaming system which includes a multi-player wheel bonus is illustrated. In this embodiment, the gaming system assigns each of the active players to a stationary indicator of the wheel 110*a* and enables each of the players to select a color associated with the wheel. In this embodiment, the wheel 110*a* includes a plurality of stationary indicators, such as 60*a*, 60*b*, 60*c*, 60*d*, and 60*e*. Each of the indicators 60*a*, 60*b*, 60*c*, 60*d*, and 60*e* remains in a fixed position on the display device 18*e* and is adapted to indicate or point to one of the sections of the wheel. Similar to the embodiment of FIGS. 4A through 4D described above, each of the sections 66, such as sections 66*a*, 66*b*, and 66*c* of the wheel 110*a* is associated with an award symbol 62. Each of the sections of the wheel 110*a* is also associated with a characteristic, such as a color 64. Each award symbol is associated with an award, such as a value. Each of the colors is associated with a modifier, such as a multiplier. For example, section 66*a* is associated with a value 75 and a color green, section 66*b* is associated with a value 200 and a color red, and section 66*c* is associated with a value 125 and a color blue. In this embodiment, the color green is associated with a multiplier of 2×, the color red is associated with a multiplier of 5×, and the color blue is associated with a multiplier of 10×.

Figure 5A:
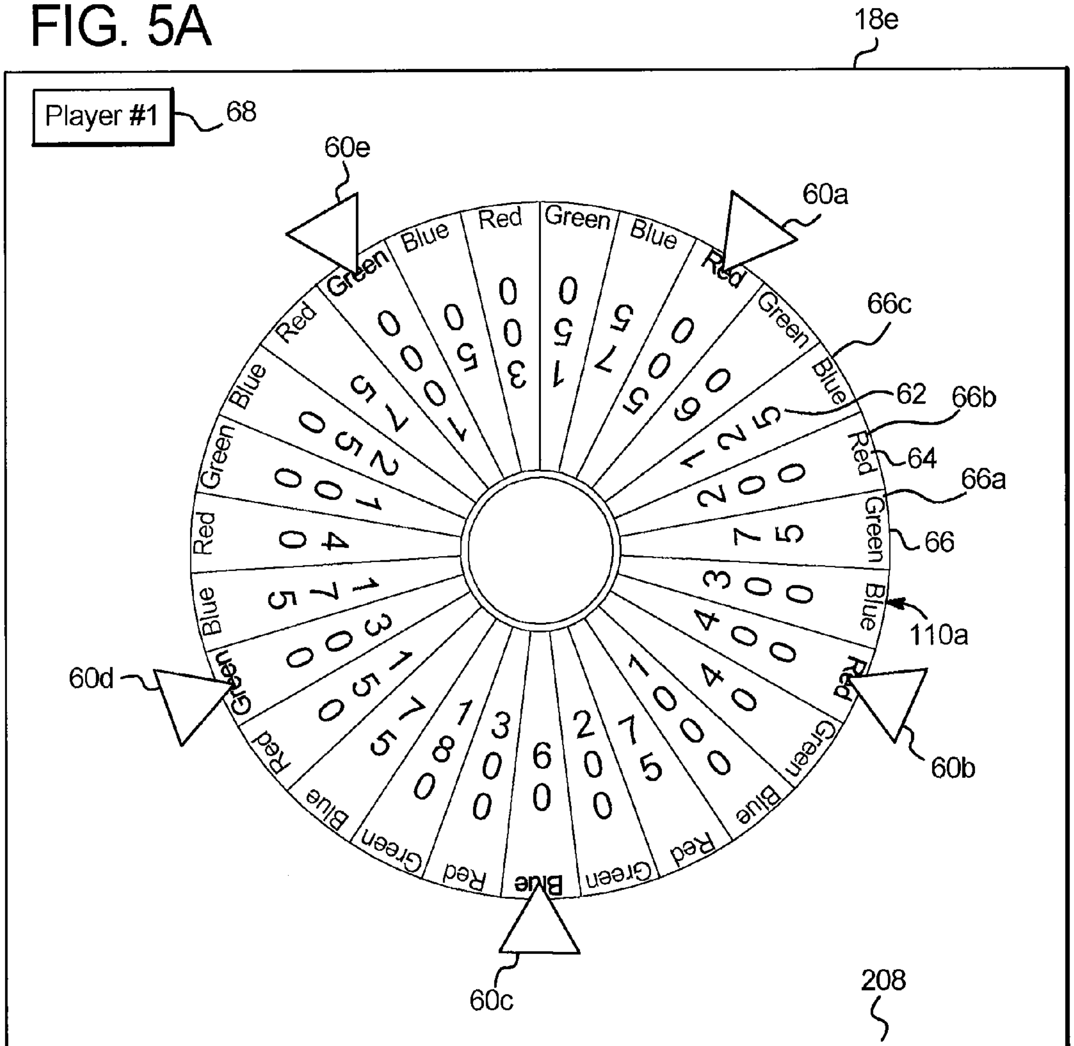
FIGS. 5A, 5B, 5C, 5D, and 5E are front elevational views of another embodiment of the present disclosure illustrating a multi-player wheel bonus game which assigns each of the players to a stationary indicator, enables each of the players to select a color associated with the wheel, provides an award for the section indicated by the assigned indicator, and provides a modified award associated with the selected color.

In one embodiment, upon the occurrence of a suitable triggering event, the gaming system activates the multi-player wheel bonus game and enables each of the active players of each of the plurality of individual gaming devices to play the bonus game. As seen in FIG. 5A, after the suitable triggering event occurs, the gaming system generates message 208 on display device 18*e* that reads, "A MULTI-PLAYER WHEEL BONUS GAME HAS BEEN ACTIVATED! YOU WILL BE ASSIGNED TO ONE OF THE STATIONARY INDICATORS ON THE WHEEL, THE WHEEL WILL SPIN AND WHEN IT STOPS, YOU WILL WIN AN AWARD EQUAL TO THE VALUE OF THE SECTION INDICATED BY YOUR ASSIGNED INDICATOR."

Figure 5B:
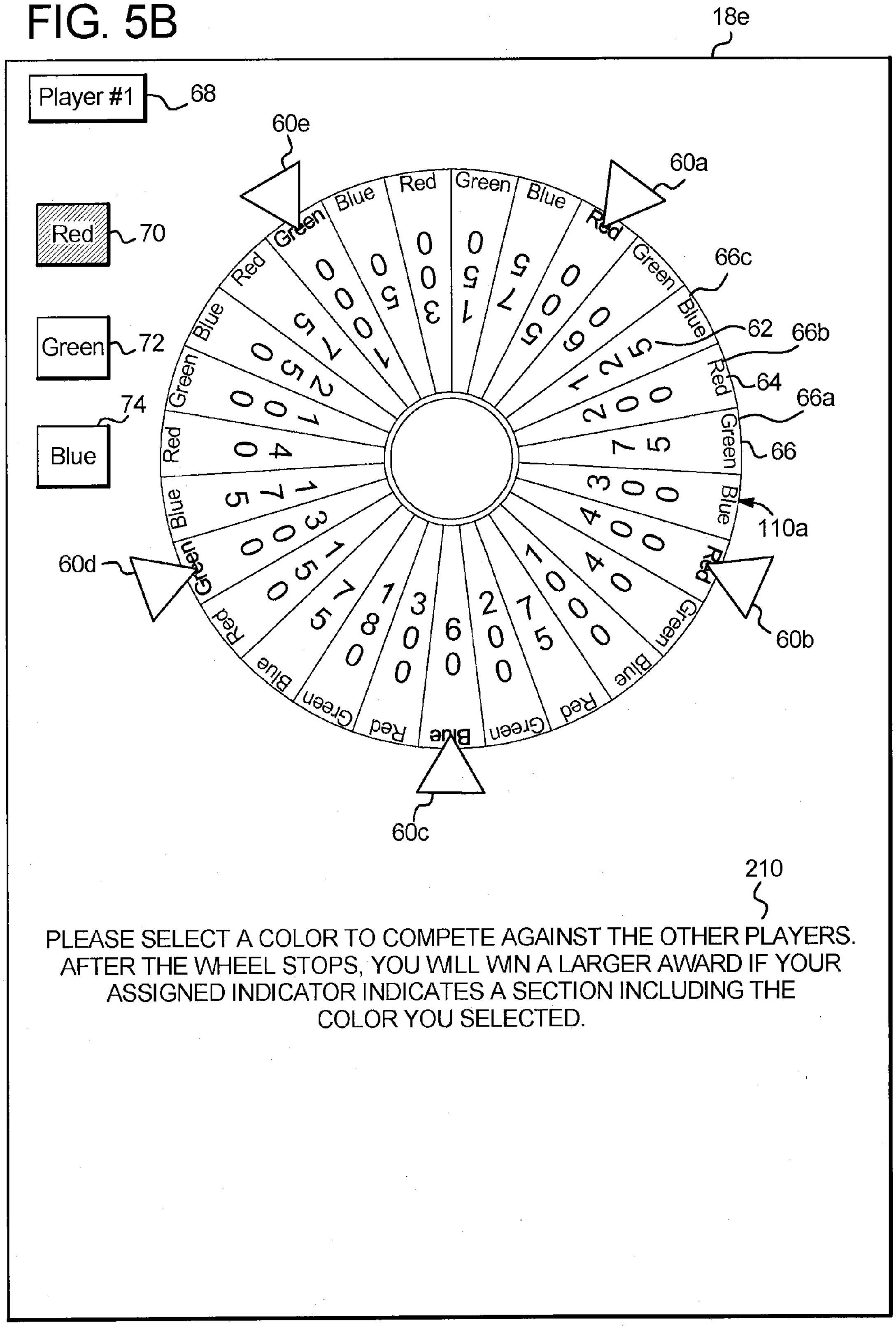

As seen in FIG. 5B, after the message 208 is generated, the gaming system prompts the player of gaming machine 10*g* to select a color by generating message 210 on display device 18*e* that reads, "PLEASE SELECT A COLOR TO COMPETE AGAINST THE OTHER PLAYERS. AFTER THE WHEEL STOPS, YOU WILL WIN A LARGER AWARD IF YOUR ASSIGNED INDICATOR INDICATES A SECTION INCLUDING THE COLOR YOU SELECTED." As shown in FIG. 5B, the gaming device also causes the display device 18*e* to display selections 70, 72, and 74. Each of the selections 70, 72, and 74 is associated with at least one characteristic of the wheel. For example, selection 70 is associated with the color red of the wheel, selection 72 is associated with the color green of the wheel, and selection 74 is associated with the color blue of the wheel. In this embodiment, the player selects selection 70 associated with the color red, as indicated by selection 70 being illuminated or highlighted.

Figure 5C:
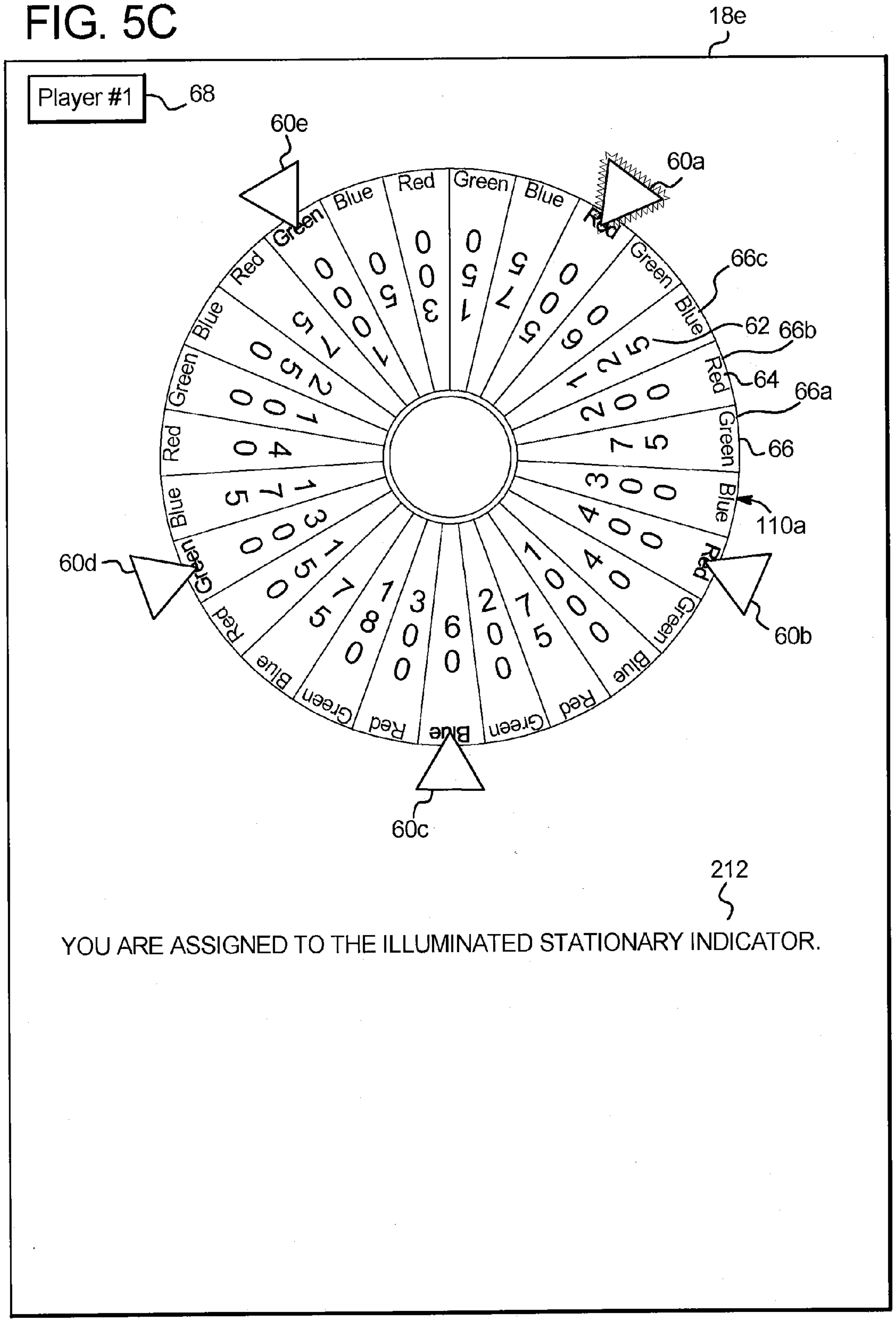
Figure 5D:
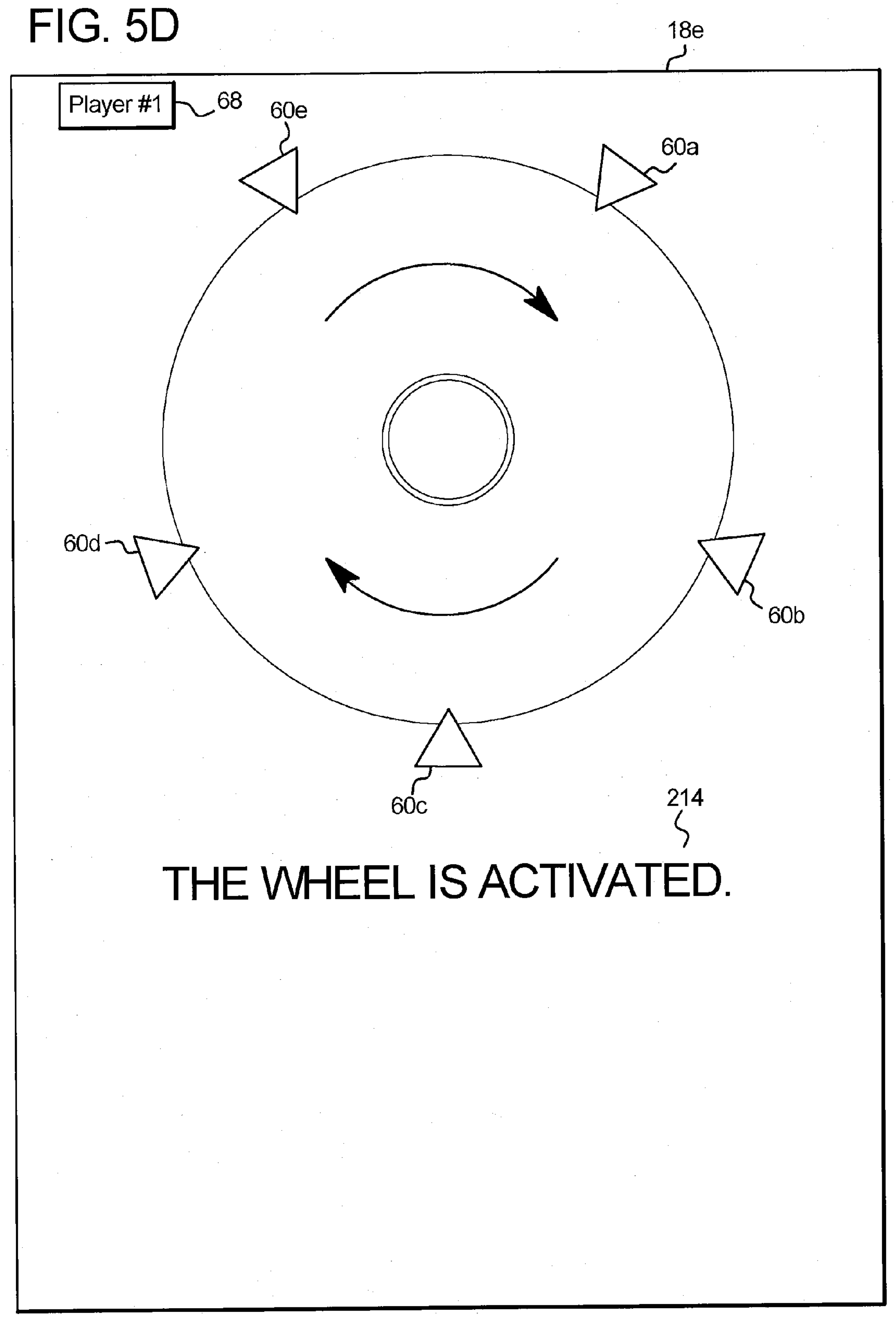
Figure 5E:
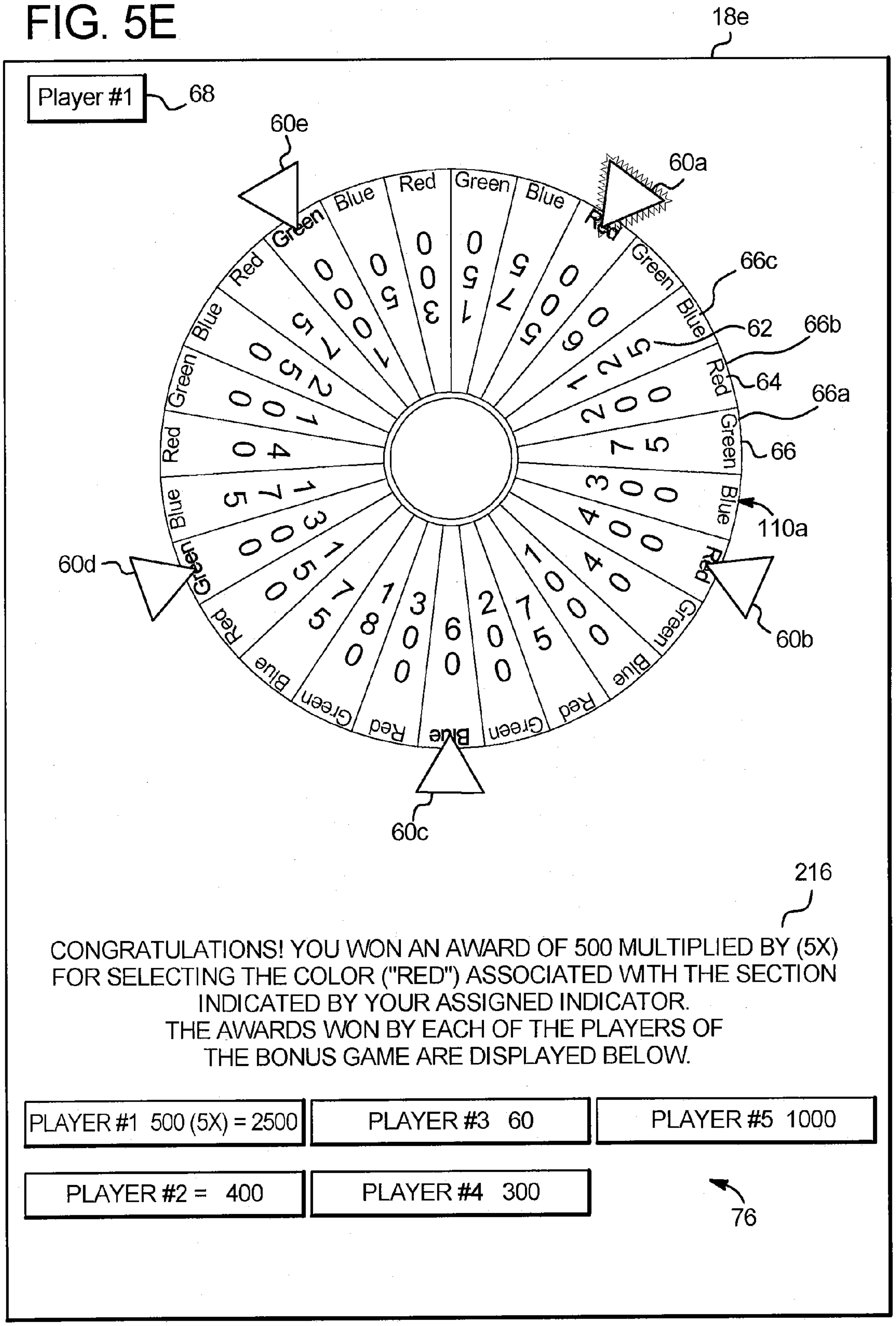

As shown in FIG. 5C, after the player selects a color, the gaming system assigns the player to one of the stationary indicators 60*a*, 60*b*, 60*c*, 60*d*, and 60*e* of the wheel 110*a* and generates message 212 on display device 18*e* that reads, "YOU ARE ASSIGNED TO THE ILLUMINATED STATIONARY INDICATOR." In the illustrated embodiment, the gaming system assigned the player to stationary indicator 60*a*, as indicated by the stationary indicator 60*a* being illuminated or highlighted. As seen in FIG. 5D, after the gaming system assigned the player to stationary indicator 60*a*, the gaming system activates or spins the wheel 110*a* and generates message 214 on display device 18*e* that reads, "THE WHEEL IS ACTIVATED." As seen in FIG. 5E, after the gaming system stops the activated wheel, the gaming system causes the display device 18*e* to highlight or illuminate the section of the wheel the player's assigned stationary indicator 60*a* points to or indicates. The section the indicator 60*a* indicates is associated with the award value of 500 and the color red. The gaming system and device provide the player with an award of 500 for indicating the section associated with the value of 500 multiplied by (5×) for selecting the color red, for a total award of 2500. Player award display 76 displays the awards won by each of the active players of the multi-player bonus game. The gaming system generates message 216 on display device 18*e* that reads, "CONGRATULATIONS! YOU WON AN AWARD OF 500 MULTIPLIED BY (5×) FOR SELECTING THE COLOR ("RED") ASSOCIATED WITH THE SECTION INDICATED BY YOUR ASSIGNED INDICATOR. THE AWARDS WON BY EACH OF THE PLAYERS OF THE BONUS GAME ARE DISPLAYED BELOW."

Referring now generally to FIGS. 6A through 6E, another embodiment of a multi-player wheel bonus game is illustrated. In this embodiment, the gaming system enables each of the players of the bonus game to select at least one section of the wheel and a color associated with the wheel. In this embodiment, the plurality of sections 66 of the wheel 110*a* are labeled 1 to 27. Similar to the embodiments of FIGS. 4A through 4D and 5A through 5D described above, each of the sections 66 of wheel 110*a* is associated with an award symbol 62 and a color. In this embodiment, however, the gaming system and device do not initially display the characteristics associated with each of the sections of wheel. Instead, the gaming system causes the display device to initially hide or mask each of the characteristics associated with the sections of the wheel and reveal the characteristics after activating the wheel. In this embodiment, each award symbol is associated with an award, such as a value. Each color is associated with a modifier, such as a multiplier. For example, in FIG. 6A, the section labeled 8 is associated with a value 75 and a hidden color green, the section labeled 7 is associated with a value 200 and a hidden color red, and the section labeled 6 is associated with a value 125 and a hidden color blue. In this embodiment, the hidden color green is associated with a multiplier of 2×, the hidden color red is associated with a multiplier of 5×, and the hidden color blue is associated with a multiplier of 10×.

Figure 6A:
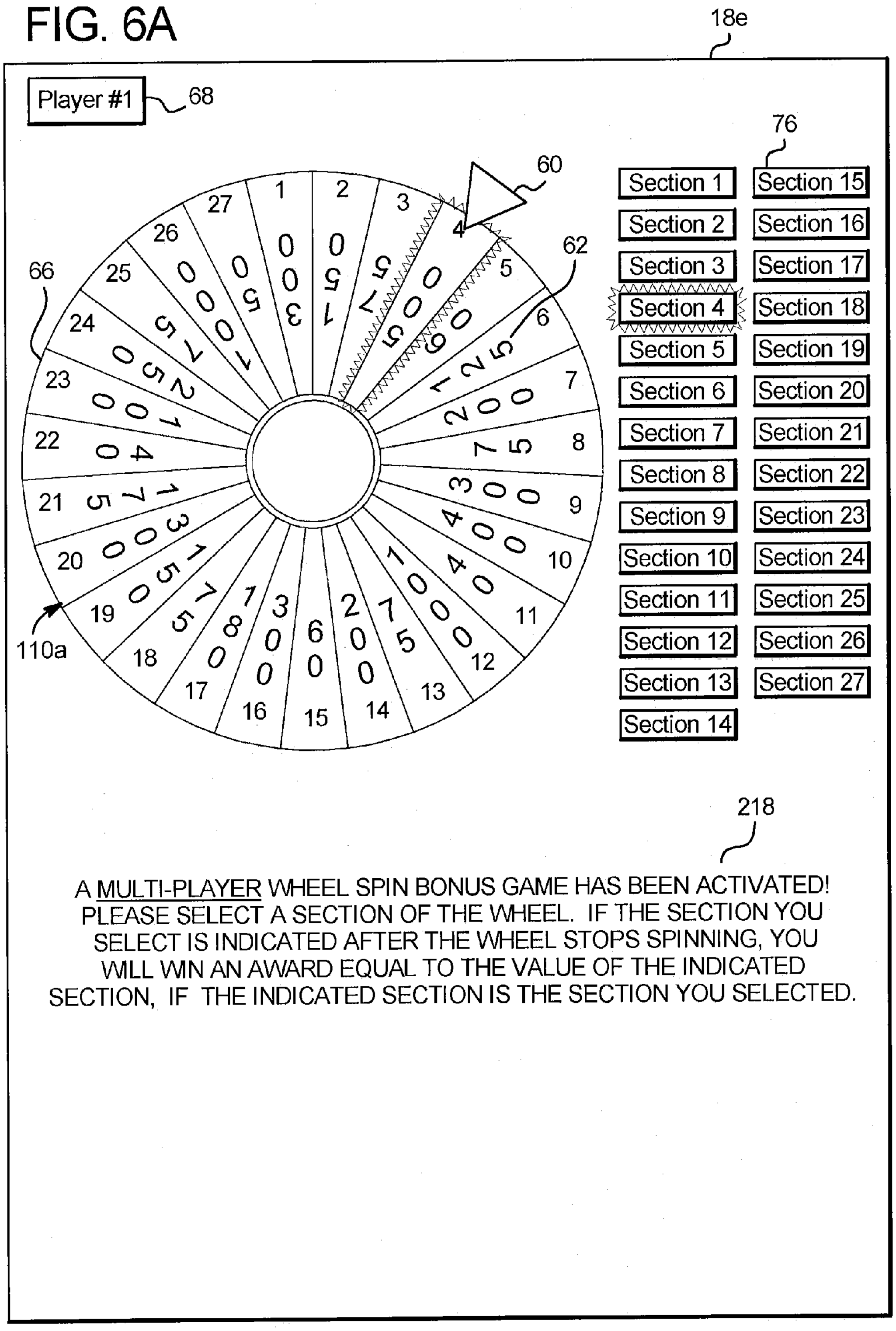
FIGS. 6A, 6B, 6C, 6D, and 6E are front elevational views of an additional embodiment of the present disclosure illustrating a multi-player wheel game which enables each of the players to select a section of the wheel and a color associated with the wheel, provides an award associated with the selected section, and provides a modified award associated with the selected color and the selected section.

In one embodiment, upon the occurrence of a suitable triggering event, the gaming system activates the multi-player wheel bonus game and enables each of the players at each of the gaming devices to play the bonus game. As seen in FIG. 6A, after the suitable triggering event occurs, the gaming system generates message 218 on the display device 18*e* that reads, "A MULTI-PLAYER WHEEL BONUS GAME HAS BEEN ACTIVATED! PLEASE SELECT A SECTION OF THE WHEEL. IF THE SECTION YOU SELECT IS INDICATED AFTER THE WHEEL STOPS SPINNING, YOU WILL WIN AN AWARD EQUAL TO THE VALUE OF THE INDICATED SECTION." The gaming system also causes display device 18*e* to display selections 76. Each of the selections are labeled Section 1, Section 2, Section 3 . . . etc., corresponding to each of the sections of the wheel labeled 1 to 27.

In one embodiment, the gaming system enables each of the players to accumulate tokens during game play. Each token enables a player to select one section of the wheel for a play of the bonus game. In another embodiment, a plurality of tokens enables a player to select one section of the wheel for a play of the bonus game. In another embodiment, the accumulation of more than one token enables a player to select more than one section of the wheel for a play of the bonus game. In the embodiment illustrated in FIG. 6A, the player selects Section 4 of the wheel, as indicated by selection 76 labeled Section 4 being highlighted or illuminated. In alternative embodiments, the gaming system controller is configured to cause the display device 18*e* to display a player's selection by placing a token on the selected section.

Figure 6B:
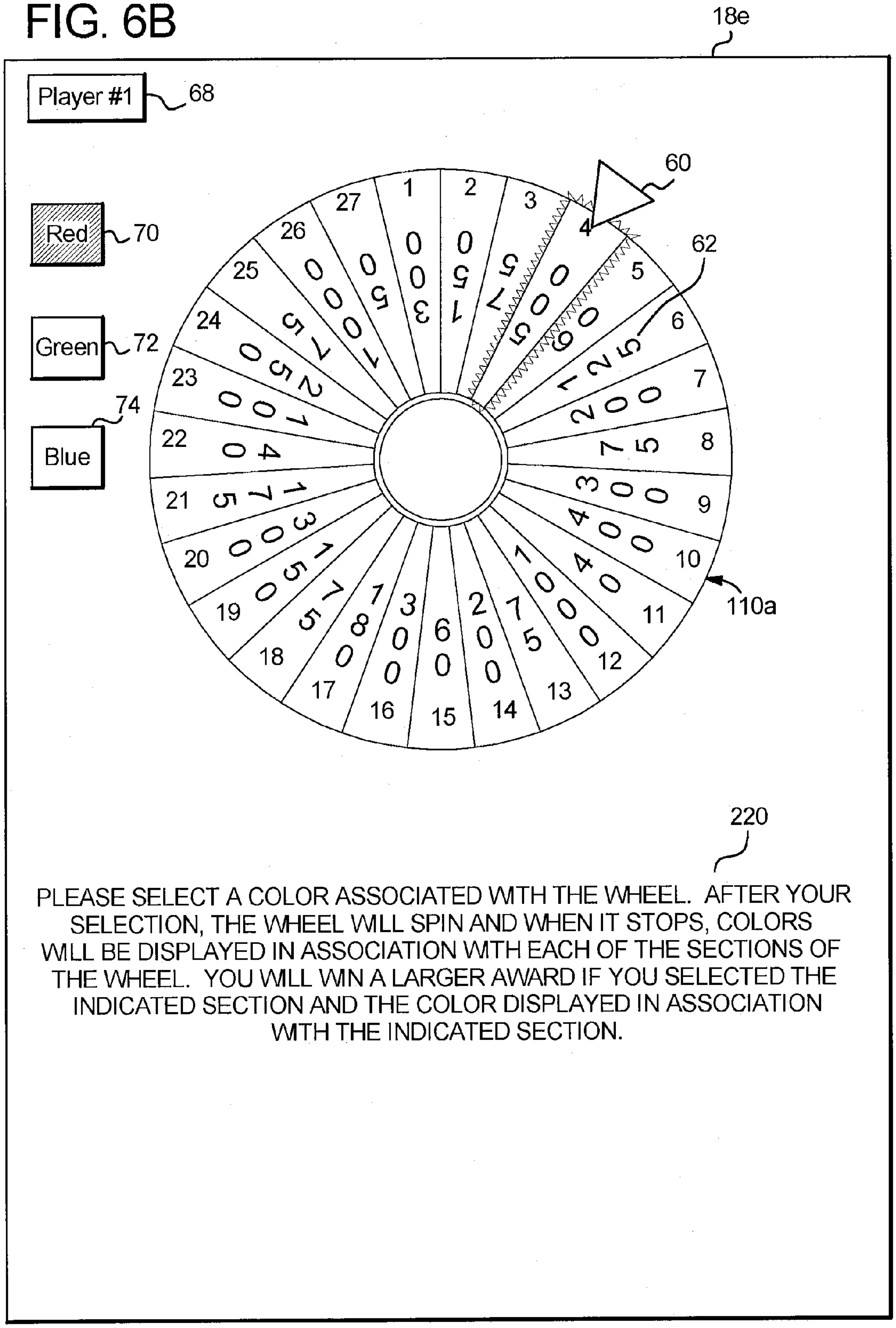

As seen in FIG. 6B, after the player selects a section of the wheel, the gaming system prompts the player to select a color associated with the wheel by generating message 220 on display device 18*e* that reads, "PLEASE SELECT A COLOR ASSOCIATED WITH THE WHEEL. AFTER YOUR SELECTION, THE WHEEL WILL SPIN AND WHEN IT STOPS, COLORS WILL BE DISPLAYED IN ASSOCIATION WITH EACH OF THE SECTIONS OF THE WHEEL. YOU WILL WIN A LARGER AWARD IF YOU SELECTED THE INDICATED SECTION AND THE COLOR DISPLAYED IN ASSOCIATION WITH THE INDICATED SECTION." As shown in FIG. 6B, the gaming system causes the display of selections 70, 72, and 74 on display device 18*e*. Each of the selections 70, 72, and 74 is associated with at least one characteristic of the wheel. For example, as seen in FIG. 6B, selection 70 is associated with the color red of the wheel, selection 72 is associated with the color green of the wheel, and selection 74 is associated with the color blue of the wheel. When the player makes a color selection, the colors are not yet displayed in association with each of the sections of the wheel. In this embodiment, the player selected selection 70 associated with the color of red, as indicated by selection 70 being highlighted or illuminated.

Figure 6C:
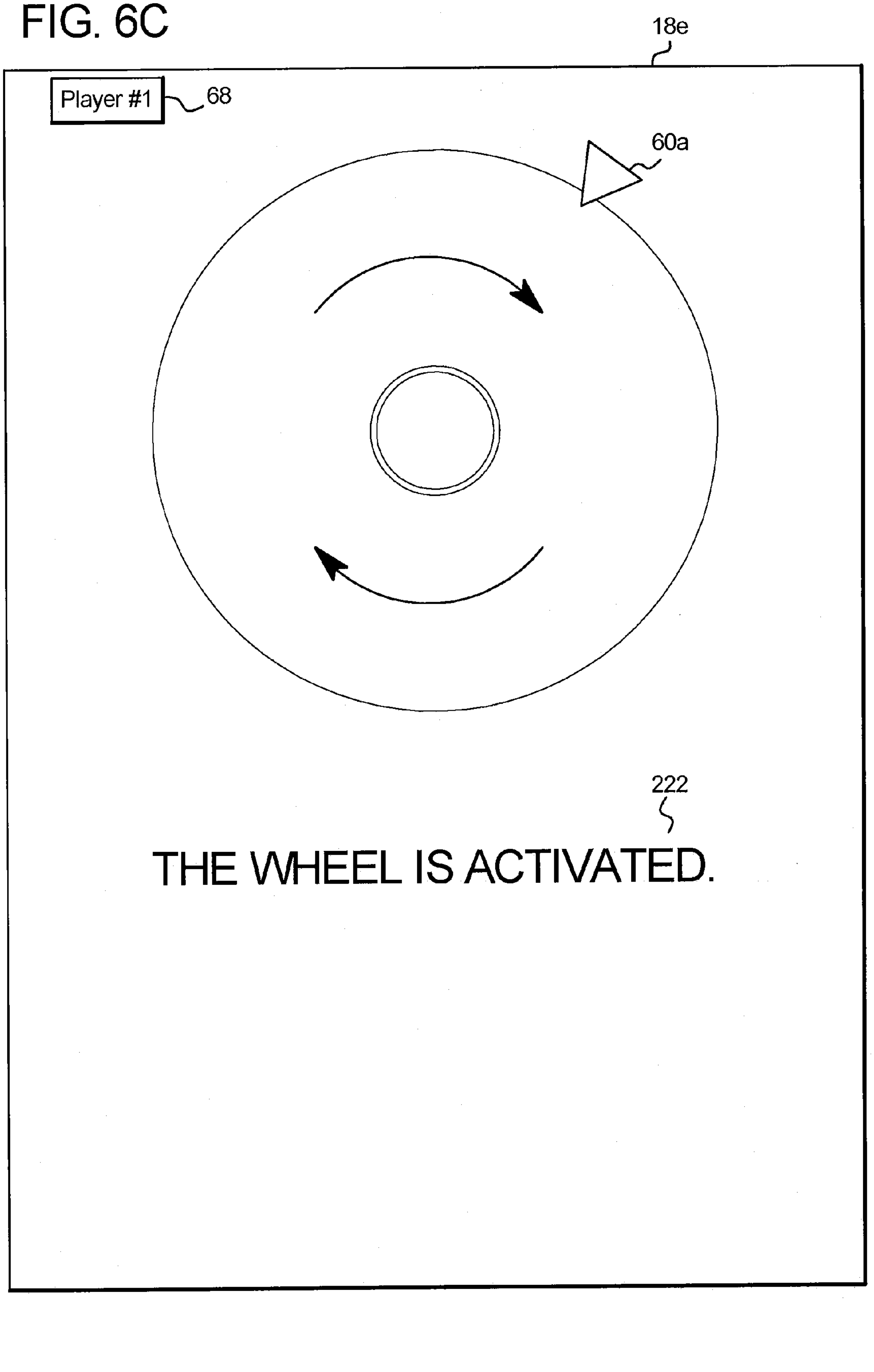
Figure 6D:
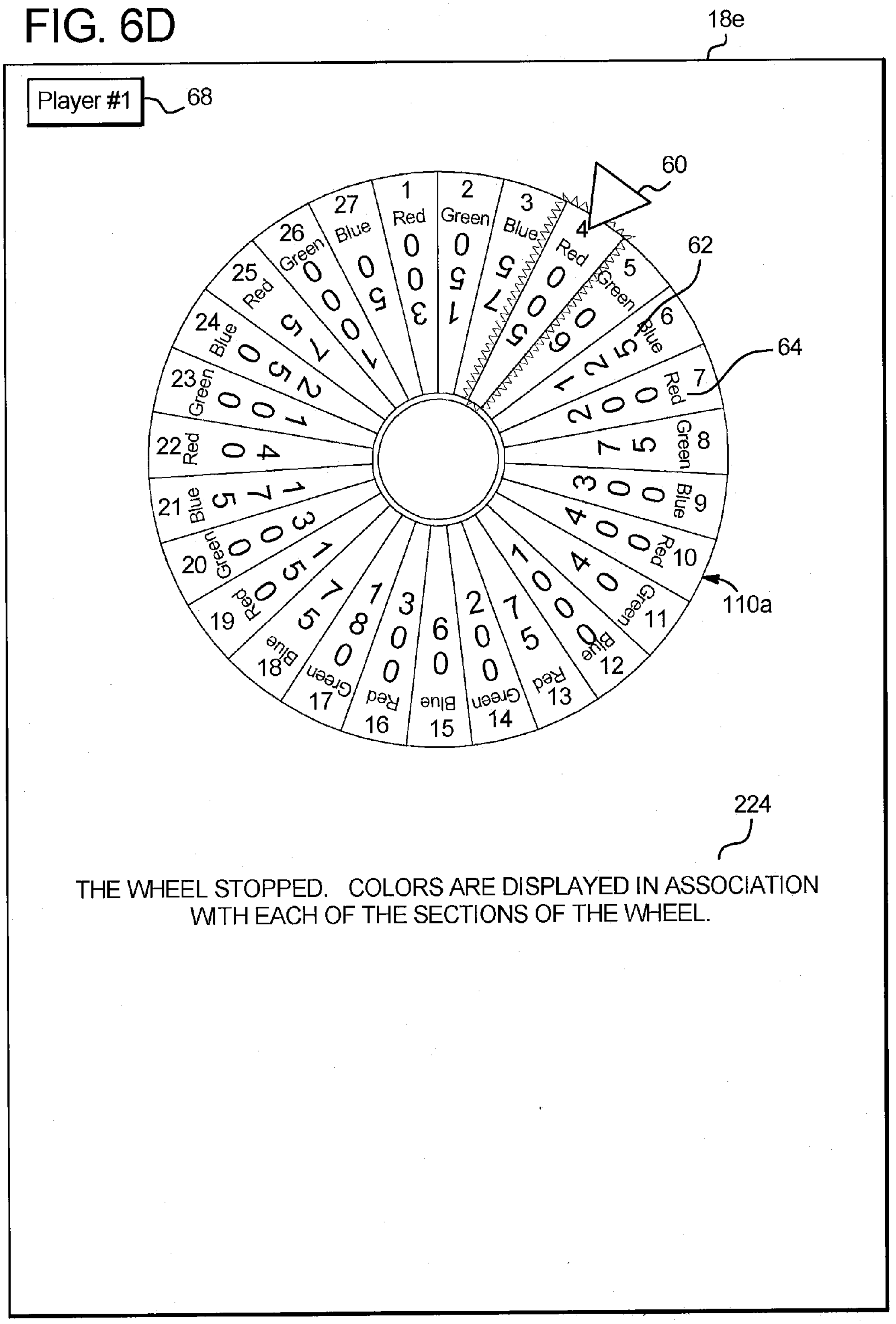
Figure 6E:
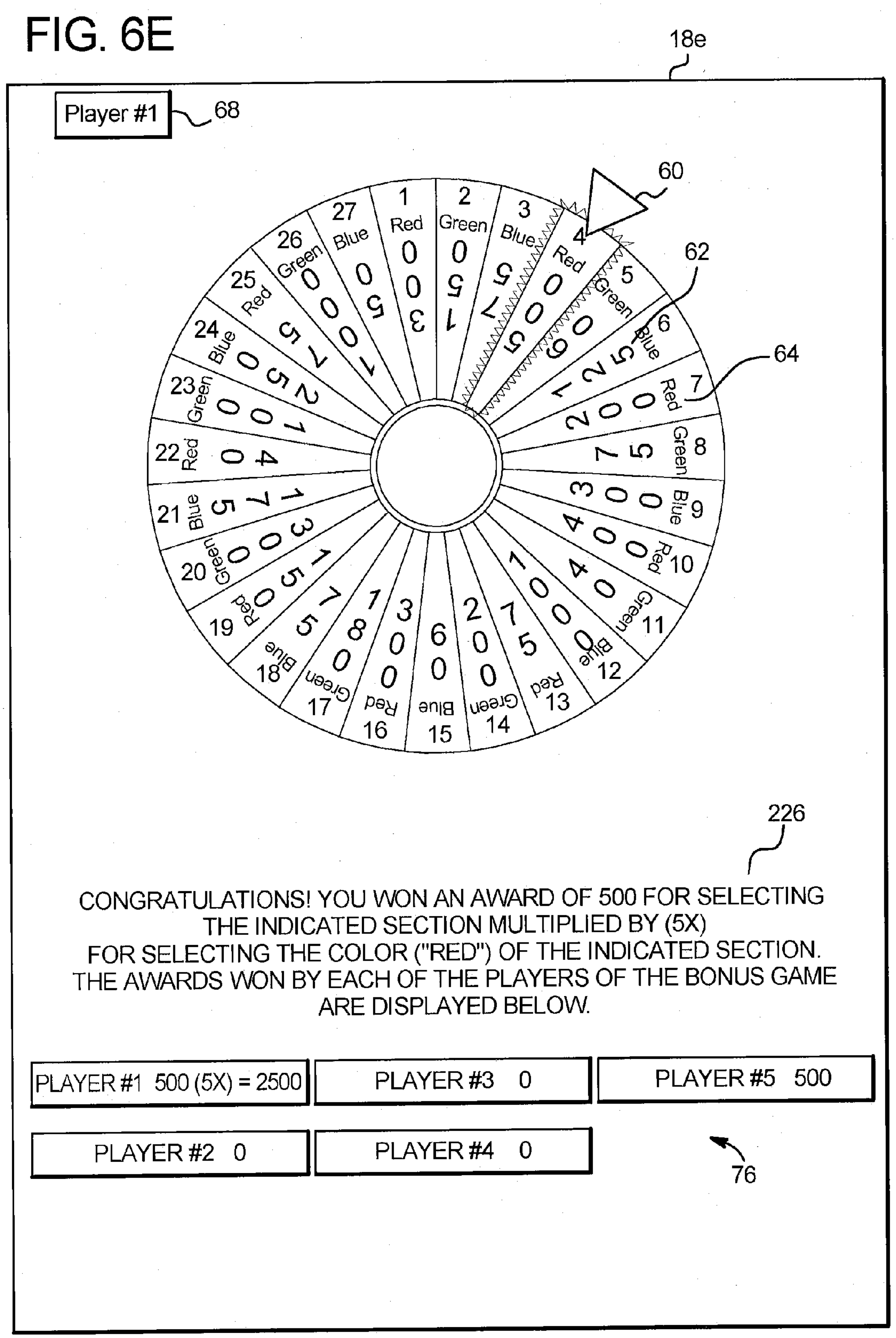

As shown in FIG. 6C, after the player selects a color, the gaming system activates or spins the wheel and generates message 222 on display device 18*e* that reads, "THE WHEEL IS ACTIVATED." As seen in FIG. 6D, after the gaming system stops the activated wheel, the gaming system displays one of the colors in association with each of the sections of the wheel and generates message 224 that reads, "THE WHEEL STOPPED. COLORS ARE DISPLAYED IN ASSOCIATION WITH EACH OF THE SECTIONS OF THE WHEEL." In this embodiment, indicator 60 points to the section of the wheel labeled as 4, which displays the color red in association it. Accordingly, the gaming system and device provide the player with an award equal to 500 for selecting the indicated section multiplied by (5×) for selecting the color associated with the indicated section. Player award display 76 displays the awards won by each of the active players of the multi-player bonus game. The gaming system generates message 226 on display device 18*e* that reads, "CONGRATULATIONS! YOU WON AN AWARD OF 500 FOR SELECTING THE INDICATED SECTION MULTIPLIED BY (5×) FOR SELECTING THE COLOR ("RED") OF THE INDICATED SECTION. THE AWARDS WON BY EACH OF THE PLAYERS OF THE BONUS GAME ARE DISPLAYED BELOW."

In a further embodiment of a multi-player wheel bonus game, each award symbol is associated with a multiplier, such as 100×, 50×, and 10×, rather than a value. In this embodiment, the gaming system provides an award to a player based on the player's wager amount multiplied by the multiplier associated with the indicated award symbol. For example, if a player places a wager of 25 credits and the wheel indicates a section that includes an award symbol associated with a multiplier of 10×, the controller and the gaming device provide a total award of 250 (25 credits of the wager multiplied by the multiplier of 10×). In this embodiment, the controller and the gaming device provide a modified award if the player selected the characteristic of the indicated section. For example, if the player places a wager of 25 credits and selects the color blue associated with a multiplier of 10× and the indicated section includes the color blue, the controller and gaming device provide a total award of 2500 (25 credits of the wager, multiplied by the multiplier 10× associated with the award symbol of the indicated section, multiplied by 10× associated with the color blue of the indicated section). In one embodiment, each of the multipliers associated with each of the award symbols are different. In another embodiment, a plurality of the multipliers associated with the award symbols are different.

In one embodiment, the triggering event that activates each of the multi-player bonus wheel games described herein occurs based on any displayed event in the primary game or based specifically on any of the plays of any primary game or on any of the plays of any secondary game of the gaming machines in the system. In another embodiment, the triggering event occurs in an apparently random fashion as perceived by the players of these gaming machines. In this embodiment, the triggering event is independent of any displayed event in the primary game or based specifically on any of the plays of any primary game or on any of the plays of any secondary game of the gaming machines in the system. That is, these triggering events are provided to the players without any explanation or alternatively with simple explanations.

In an alternative embodiment, the triggering event occurs based on a predefined variable reaching a defined parameter threshold. For example, when the $500{,}000^{th}$ player has played a gaming machine of the gaming system (ascertained from a player tracking system), such a triggering event occurs. In different embodiments, the predefined parameter thresholds include a length of time, a length of time after a certain dollar amount is hit, a wager level threshold for a specific machine (which gaming device is the first to contribute $250,000), a number of gaming machines active, an amount of coin-in allocated to one or more pools, or any other parameter that defines a suitable threshold.

In another embodiment, the triggering event occurs based on time. In this embodiment, a time is set for when such a triggering event will occur. In one embodiment, such a set time is based on historic data.

In another embodiment, the triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts their player tracking card in the gaming machine. The central server/gaming device processor determines the player tracking level of the player and if the current player tracking level defined by the gaming system operator is eligible to play for one of the personal progressive awards associated with that player. In one embodiment, the gaming system operator defines minimum bet levels required for the triggering event to occur based on the player's card level.

In another embodiment, the triggering event occurs based on a system determination, wherein the triggering event occurs due to a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria). In one such embodiment, based on the gaming machine's state as well as one or more wager pools associated with the gaming machine, the central controller determines whether the triggering event occurs in association with that player. In one such embodiment, the player who consistently places a higher wager is more likely to cause a triggering event to occur than a player who consistently places a minimum wager.

In another embodiment, the triggering event occurs by determining if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, such a triggering event occurs for the player at that particular gaming machine. It should be appreciated that any suitable manner of causing a triggering event to occur may be implemented in accordance with the gaming system and method disclosed herein.

In one embodiment, the gaming system causes the characteristics associated with each of the sections of the wheel to be displayed evenly. For example, in the embodiments described above, the gaming system causes the display device to display the colors red, blue, and green in association with each of the sections of the wheel in a pattern of red, blue, green . . . red, blue, green . . . etc. In this embodiment, the gaming system causes the color red to be displayed in association with the same number of sections of the wheel as the color blue, for example. In other embodiments, the gaming system causes the characteristics associated with each of the sections of the wheel to be displayed unevenly. For example, the gaming system causes the display device to display the colors red, blue, and green in association with each of the sections of the wheel in a pattern such of red, red, blue, green . . . red, red, blue, green. That is, the gaming system causes certain colors, such as red, to be displayed in association with a greater number of sections of the wheel than other colors, such as blue. It should be appreciated that the gaming system may cause the characteristics to be displayed in associated with the sections of the wheel in no particular pattern and/or to be displayed evenly or unevenly.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, said method comprising:

(a) causing at least one display device to display:

(i) at least one wheel including a plurality of sections and a plurality of indicators, each of the plurality of indicators associated with a different one of said sections, each section associated with at least one award symbol, and (ii) for each of a plurality of sections of the wheel, one characteristic from a plurality of different characteristics on said section of the wheel, each of said characteristics associated with a modifier, (b) enabling each of a plurality of players to select at least one of said characteristics, (c) causing at least one processor to execute a plurality of instructions to assign each of the plurality of players to one of the plurality of indicators, (d) causing the at least one processor to execute the plurality of instructions to activate the wheel, (e) for each of said indicators, causing the at least one processor to execute the plurality of instructions to determine at least one award based on the award symbol associated with the section indicated by the indicator, (f) for each of said indicators, causing the at least one processor to execute the plurality of instructions to determine at least one modified award for the characteristic associated with the section indicated by the indicator, (g) for each of the players assigned to an indicator that indicates their selected characteristic, providing the at least one modified award, and (h) for each of the players assigned to an indicator that does not indicate their selected selection, providing the at least one award based on the award symbol associated with the section indicated by the player's indicator.

2. The method of claim 1, wherein the plurality of characteristics are colors.

3. The method of claim 1, which includes causing the at least one processor to execute the plurality of instructions to assign each of the plurality of the players to different ones of the indicators.

4. The method of claim 1, wherein the assigning of an indicator includes highlighting at least a portion of said indicator.

5. The method of claim 1, which is executed through a data network.

6. The method of claim 5, wherein the data network is an internet.

7. A method of operating a gaming system, said method comprising:

(a) causing at least one display device to display:

at least one wheel including a plurality of sections and at least one indicator, each section associated with at least one award symbol, and (ii) for each of a plurality of sections of the wheel, one characteristic from a plurality of different characteristics on said section of the wheel, each of said characteristics associated with a modifier, (b) enabling each of a plurality of players to select at least one of said characteristics and at least one of said sections of the wheel, (c) causing at least one processor to execute a plurality of instructions to activate the wheel, (d) indicating at least one of the sections of the wheel with said at least one indicator, (e) causing the at least one display device to display at least one of the plurality of characteristics in association with each of the sections of the wheel, (f) causing the at least one processor to execute the plurality of instructions to determine at least one award associated with the award symbol of the indicated section, (g) for each of the sections, causing the at least one processor to execute the plurality of instructions to determine at least one modified award for the characteristic displayed in association with the indicated section, (h) for each of the players that selected the indicated section and the characteristic displayed in association with the indicated section, providing the at least one modified award, and (i) for each of the players that selected the indicated section and did not select the characteristic displayed in association with the indicated section, providing the at least one award.

8. The method of claim 7, wherein the plurality of characteristics are colors.

9. The method of claim 7, which includes indicating said selections of the sections by placing a token in each of said selected sections.

10. The method of claim 7, which includes enabling each of the plurality of players to select a plurality of said sections of the wheel.

11. The method of claim 7, wherein the displaying of a plurality of characteristics includes displaying at least one color for each of said sections.

12. The method of claim 7, wherein the indicating of at least one the sections of one of the wheels includes highlighting at least a portion of said section.

13. The method of claim 7, which is executed through a data network.

14. The method of claim 13, wherein the data network is an internet.

15. A method of operating a gaming system, said method comprising:

(a) causing at least one shared display device to display:

(i) at least one wheel including a plurality of sections and at least one indicator, each section associated with at least one award, and (ii) for each of a plurality of sections of the wheel, one characteristic from a plurality of different characteristics on said section of the wheel, each of said characteristics associated with a modifier;

(b) enabling each of a plurality of players to select at least one of said characteristics, (c) causing at least one processor to execute a plurality of instructions to activate the wheel, (d) indicating at least one of the sections of the wheel with said at least one indicator, (e) causing the at least one processor to execute the plurality of instructions to determine at least one award based on the award symbol associated with said indicated section, (f) causing the at least one processor to execute the plurality of instructions to determine at least one modified award for the characteristic associated with said indicated section, (g) for each of the players that selected said characteristic associated with the indicated section, providing the at least one modified award, and (h) for each of the players that did not select said characteristic associated with the indicated section, providing the at least one award.

16. The method of claim 15, wherein the plurality of characteristics are colors.

17. The method of claim 15, which is executed through a data network.

18. The method of claim 17, wherein the data network is an internet.

19. A non-transitory computer readable medium including a plurality of instructions, which when executed by at least one processor, cause the at least one processor to:

(a) cause at least one display device to display:

(i) at least one wheel including a plurality of sections and a plurality of indicators, each of the plurality of indicators associated with a different one of said sections, each section associated with at least one award symbol, and (ii) for each of a plurality of sections of the wheel, one characteristic from a plurality of different characteristics on said section of the wheel, each of said characteristics associated with a modifier, (b) enable each of a plurality of players to select at least one of said characteristics, (c) assign each of the plurality of players to one of the plurality of indicators, (d) activate the wheel, (e) for each of said indicators, determine at least one award based on the award symbol associated with the section indicated by the indicator, (f) for each of said indicators, determine at least one modified award for the characteristic associated with the section indicated by the indicator, (g) for each of the players assigned to an indicator that indicates their selected characteristic, provide the at least one modified award, and (h) for each of the players assigned to an indicator that does not indicate their selected selection, provide the at least one award based on the award symbol associated with the section indicated by the player's indicator.

20. The non-transitory computer readable medium of claim 19, wherein the plurality of characteristics are colors.

21. The non-transitory computer readable medium of claim 19, wherein when executed by the at least one processor, the plurality of instructions cause the at least one processor to assign each of the plurality of the players to different ones of the indicators.

22. The non-transitory computer readable medium of claim 19, wherein the assigning of an indicator includes highlighting at least a portion of said indicator.

23. A non-transitory computer readable medium including a plurality of instructions, which when executed by at least one processor, cause the at least one processor to:

(a) cause at least one display device to display:

at least one wheel including a plurality of sections and at least one indicator, each section associated with at least one award symbol, and (ii) for each of a plurality of sections of the wheel, one characteristic from a plurality of different characteristics on said section of the wheel, each of said characteristics associated with a modifier, (b) enabling each of a plurality of players to select at least one of said characteristics and at least one of said sections of the wheel, (c) activate the wheel, (d) indicate at least one of the sections of the wheel with said at least one indicator, (e) cause the at least one display device to display at least one of the plurality of characteristics in association with each of the sections of the wheel, (f) determine at least one award associated with the award symbol of the indicated section, (g) for each of the sections, determine at least one modified award for the characteristic displayed in association with the indicated section, (h) for each of the players that selected the indicated section and the characteristic displayed in association with the indicated section, provide the at least one modified award, and (i) for each of the players that selected the indicated section and did not select the characteristic displayed in association with the indicated section, provide the at least one award.

24. The non-transitory computer readable medium of claim 23, wherein the plurality of characteristics are colors.

25. The non-transitory computer readable medium of claim 23, wherein when executed by the at least one processor, the plurality of instructions cause the at least one processor to indicate said selections of the sections by placing a token in each of said selected sections.

26. The non-transitory computer readable medium of claim 23, wherein when executed by the at least one processor, the plurality of instructions cause the at least one processor to enable each of the plurality of players to select a plurality of said sections of the wheel.

27. The non-transitory computer readable medium of claim 23, wherein the displaying of a plurality of characteristics includes displaying at least one color for each of said sections.

28. The non-transitory computer readable medium of claim 23, wherein when executed by the at least one processor, the plurality of instructions cause the at least one processor to indicate of at least one the sections of one of the wheels by highlighting at least a portion of said section.

29. A non-transitory computer readable medium including a plurality of instructions, which when executed by at least one processor, cause the at least one processor to:

(a) cause at least one shared display device to display:

(i) at least one wheel including a plurality of sections and at least one indicator, each section associated with at least one award, and (ii) for each of a plurality of sections of the wheel, one characteristic from a plurality of different characteristics on said section of the wheel, each of said characteristics associated with a modifier;

(b) enable each of a plurality of players to select at least one of said characteristics, (c) activate the wheel, (d) indicate at least one of the sections of the wheel with said at least one indicator, (e) determine at least one award based on the award symbol associated with said indicated section, (f) determine at least one modified award for the characteristic associated with said indicated section, (g) for each of the players that selected said characteristic associated with the indicated section, provide the at least one modified award, and (h) for each of the players that did not select said characteristic associated with the indicated section, provide the at least one award.

30. The non-transitory computer readable medium of claim 29, wherein the plurality of characteristics are colors.

* * * * *

UNITED STATES PATENT AND TRADEMARK OFFICE
CERTIFICATE OF CORRECTION

PATENT NO. : 8,597,103 B2
APPLICATION NO. : 13/335105
DATED : December 3, 2013
INVENTOR(S) : Robert E. Bigelow, Jr. et al.

It is certified that error appears in the above-identified patent and that said Letters Patent is hereby corrected as shown below:

IN THE CLAIMS

In Claim 1, Column 28, Line 30, replace “a” with --the--.
In Claim 1, Column 28, Line 54, replace “selection” with --characteristic--.
In Claim 3, Column 28, Line 61, delete the second instance of “the”.
In Claim 7, Column 29, Line 6, before the first instance of “at” insert --(i)--.
In Claim 7, Column 29, Line 9, replace “a” with --the--.
In Claim 11, Column 29, Line 46, replace “a” with --the--.
In Claim 12, Column 29, Line 49, between “of” and “at” insert --the--.
In Claim 12, Column 29, Line 50, between “one” and the first instance of “the” insert --of--.
In Claim 15, Column 29, Line 61, between “award” and “,” insert --symbol--.
In Claim 15, Column 29, Line 62, replace “a” with --the--.
In Claim 19, Column 30, Line 36, replace “a” with --the--.
In Claim 19, Column 30, Line 55, replace “selection” with --characteristic--.
In Claim 21, Column 30, Line 63, delete the second instance of “the”.
In Claim 23, Column 31, Line 5, before the first instance of “at” insert --(i)--.
In Claim 23, Column 31, Line 8, replace “a” with --the--.
In Claim 27, Column 32, Line 5, replace “a” with --the--.
In Claim 28, Column 32, Line 11, replace the first instance of “of” with --the--.
In Claim 29, Column 32, Line 19, between “award” and “,” insert --symbol--.
In Claim 29, Column 32, Line 20, replace “a” with --the--.

Signed and Sealed this
Twenty-fourth Day of March, 2015

Michelle K. Lee

Michelle K. Lee
*Director of the United States Patent and Trademark Office*